(12) United States Patent
Tan-Ngo et al.

(10) Patent No.: US 12,475,998 B2
(45) Date of Patent: Nov. 18, 2025

(54) SYSTEMS AND METHODS OF ADAPTIVELY GENERATING FACIAL DEVICE SELECTIONS BASED ON VISUALLY DETERMINED ANATOMICAL DIMENSION DATA

(71) Applicant: AR MEDICAL TECHNOLOGIES INCORPORATED, Burnaby (CA)

(72) Inventors: Cox Tan-Ngo, Richmond (CA); Hadi Mansoor, North Vancouver (CA); Ji Ma, Port Moody (CA)

(73) Assignee: AR Medical Technologies Incorporated, Burnaby (CA)

( * ) Notice: Subject to any disclaimer, the term of this patent is extended or adjusted under 35 U.S.C. 154(b) by 289 days.

(21) Appl. No.: 18/283,166

(22) PCT Filed: Mar. 25, 2022

(86) PCT No.: PCT/CA2022/050443
§ 371 (c)(1),
(2) Date: Sep. 20, 2023

(87) PCT Pub. No.: WO2022/198327
PCT Pub. Date: Sep. 29, 2022

(65) Prior Publication Data
US 2024/0170139 A1    May 23, 2024

Related U.S. Application Data

(60) Provisional application No. 63/166,723, filed on Mar. 26, 2021.

(51) Int. Cl.
*G16H 40/40* (2018.01)
*A61M 16/06* (2006.01)
(Continued)

(52) U.S. Cl.
CPC ........ *G16H 40/40* (2018.01); *A61M 16/0605* (2014.02); *G06T 7/50* (2017.01);
(Continued)

(58) Field of Classification Search
CPC ........ G16H 40/40; G16H 30/40; G16H 50/50; G16H 20/30; A61M 16/0605;
(Continued)

(56) References Cited

U.S. PATENT DOCUMENTS

| | | | | |
|---|---|---|---|---|
| 4,926,885 A | * | 5/1990 | Hinkle | A61B 5/1072 128/898 |
| 6,728,589 B1 | * | 4/2004 | Delache | A61M 16/06 700/163 |
| 7,676,400 B1 | * | 3/2010 | Dillon | G06Q 30/02 705/26.7 |
| 9,177,130 B2 | * | 11/2015 | Nechyba | G06F 21/32 |

(Continued)

FOREIGN PATENT DOCUMENTS

| | | |
|---|---|---|
| JP | 2016161569 A | 9/2016 |
| WO | 2020210666 A1 | 10/2020 |

OTHER PUBLICATIONS

Extended European Search Opinion issued in connection with European Application No. 22773848.1 dated Dec. 16, 2024.
(Continued)

*Primary Examiner* — Emily C Terrell
*Assistant Examiner* — Jordan Mckenzie Elliott
(74) *Attorney, Agent, or Firm* — Norton Rose Fulbright Canada LLP

(57) ABSTRACT

Devices and methods for adaptively generating facial device selections based on visually determined anatomical dimension data. The device may include a processor and a memory. The memory may include processor-executable instructions for receiving image data representing a user face and determining anatomical dimension data associated with a nasal-oral region of the user face based on the received image data. The processor-executable instructions may be (Continued)

for generating one or more facial device recommendations based on a recommendation model and the anatomical dimension data and providing the one or more facial device recommendations for display at a user interface.

14 Claims, 35 Drawing Sheets

(51) Int. Cl.
  *G06T 7/50* (2017.01)
  *G06T 7/62* (2017.01)
  *G06T 7/73* (2017.01)
  *G06V 40/16* (2022.01)

(52) U.S. Cl.
  CPC .............. *G06T 7/62* (2017.01); *G06T 7/73* (2017.01); *G06V 40/171* (2022.01); *G06T 2200/04* (2013.01); *G06T 2200/24* (2013.01); *G06T 2207/10024* (2013.01); *G06T 2207/10028* (2013.01); *G06T 2207/10048* (2013.01); *G06T 2207/30201* (2013.01)

(58) Field of Classification Search
  CPC ........ A61M 16/0683; A61M 2016/066; A61M 2207/00; A61M 16/06; G06T 7/50; G06T 7/62; G06T 7/73; G06T 2200/04; G06T 2200/24; G06T 2207/10024; G06T 2207/10028; G06T 2207/10048; G06T 2207/30201; G06T 17/00; G06T 2210/41; G06T 2210/56; G06V 40/171; A61B 5/1077; A61B 5/107
  See application file for complete search history.

(56) References Cited

U.S. PATENT DOCUMENTS

| | | | | |
|---|---|---|---|---|
| 9,754,154 | B2* | 9/2017 | Craig | G06F 21/32 |
| 10,220,172 | B2* | 3/2019 | Lucey | G06N 20/00 |
| 10,515,259 | B2* | 12/2019 | Jones | G06V 10/764 |
| 10,980,957 | B2* | 4/2021 | Fu | A61B 5/1077 |
| 11,040,227 | B2* | 6/2021 | Gugino | G06T 7/0016 |
| 12,023,529 | B1* | 7/2024 | Allen | A62B 27/00 |
| 2006/0023228 | A1* | 2/2006 | Geng | A61B 5/411 |
| | | | | 356/601 |
| 2014/0352134 | A1* | 12/2014 | Ho | A61M 16/06 |
| | | | | 29/592 |
| 2015/0055140 | A1* | 2/2015 | Deguilio | A61M 16/06 |
| | | | | 356/610 |
| 2015/0086108 | A1* | 3/2015 | Craig | G06V 40/164 |
| | | | | 382/154 |
| 2015/0306330 | A1* | 10/2015 | Richard | A61B 5/4818 |
| | | | | 348/77 |
| 2016/0253807 | A1* | 9/2016 | Jones | G06T 7/75 |
| | | | | 382/154 |
| 2018/0117272 | A1* | 5/2018 | Fu | G06V 10/7553 |
| 2019/0038180 | A1* | 2/2019 | Tzvieli | G02B 7/002 |
| 2020/0380099 | A1* | 12/2020 | Ridgill | G06F 21/31 |
| 2021/0299384 | A1* | 9/2021 | Fu | A61B 5/1079 |
| 2022/0215959 | A1* | 7/2022 | Kaigler | A61M 21/02 |

OTHER PUBLICATIONS

Goswami, G., Vatsa, M., Singh, R., "Face Recognition with RBG-D Images Using Kinect", book chapter in: Bourlai, T. (eds) Face Recognition Across the Imaging Spectrum, Springer, Cham, https://doi.org/10.1007/978-3-319-25801-6_12, pp. 281-303, Feb. 13, 2016.
International Preliminary Report on Patentability for PCT/CA2022/050443 dated Sep. 12, 2023.

* cited by examiner

```
import MetalKit public final class JMetalRenderer: NSObject
{
let device: MTLDevice
let library: MTLLibrary
let commandQueue: MTLCommandQueue init?(mtkView: MTKView, background: MTLClearColor, layout: Layout)
{
guard let device = MTLCreateSystemDefaultDevice() else {
print("Metal is not supported"); return nil
}
self.device = device guard let library = device.makeDefaultLibrary() else {
print("Failed to make default library"); return nil
}
self.library = library guard let commandQueue = device.makeCommandQueue() else {
print("Failed to make a command queue") return nil
}
self.commandQueue = commandQueue self.mtkView = mtkView
mtkView.device = device mtkView.colorPixelFormat = .bgra8Unorm_srgb
mtkView.depthStencilPixelFormat = .depth32Float super.init()
}

...

} extension JMetalRenderer: MTKViewDelegate
{
public func mtkView(_ view: MTKView, drawableSizeWillChange size: CGSize)
{
...
}

Public func draw(in view: MTKView)
{
...
}
}
```

FIG. 3

```
import Metal
import ARKit public final class JScene
{
let system: JNode()
let root: JNode()
let depthNode: JDepthNode?
let arFaceNode: JNode()

var camera: PerspectiveCamera var clearColor: MTLClearColor = MTLClearColor(
red: 0.0, green: 0.0, blue: 0.0, alpha: 1.0
)

init(mesh: Mesh? = nil)
{
self.eyeZ = Float(0.0)         // The TrueDepth camera location
self.centerZ = Float(500.0)    // Start at a distance of ~50cm (face location)
self.cameraUp = Float(1.0)     // The camera up direction which could changed self.camera = PerspectiveCamera(
eye: [0, 0, eyeZ],
center: [0, 0, centerZ],
up: [0, cameraUp, 0],
fovYDegrees: 70,
aspectRatio: 1.0,
zNear: 0.01,
zFar: 30000.0
)
...
}

```
import MetalKit
import ARKit public final class JDepthNode: JNode
{
    let arFrame: ARFrame?

let internalDepthFram: AVDepthData?
    let internalColorTexture: CVPixelBuffer?

let depthTextureCache: CVMetalTextureCache?
    let colorTextureCache: CVMetalTextureCache?

...

public func render(renderer: JMetalRenderer, encoder: MTLRenderCommandEncoder, parentTransform:
    Mat4)
    {
        ...
    }
    ...
}
```

FIG. 5

```
JMetalRenderer
  |— JScene
       |— JPerspectiveCamera
       |— JNode
            |— JMesh
                 |— JMaterial
                      |— JTexture
                 |— JDepthNode
                 |— JDepthNode
                 |— ...
```

FIG. 6

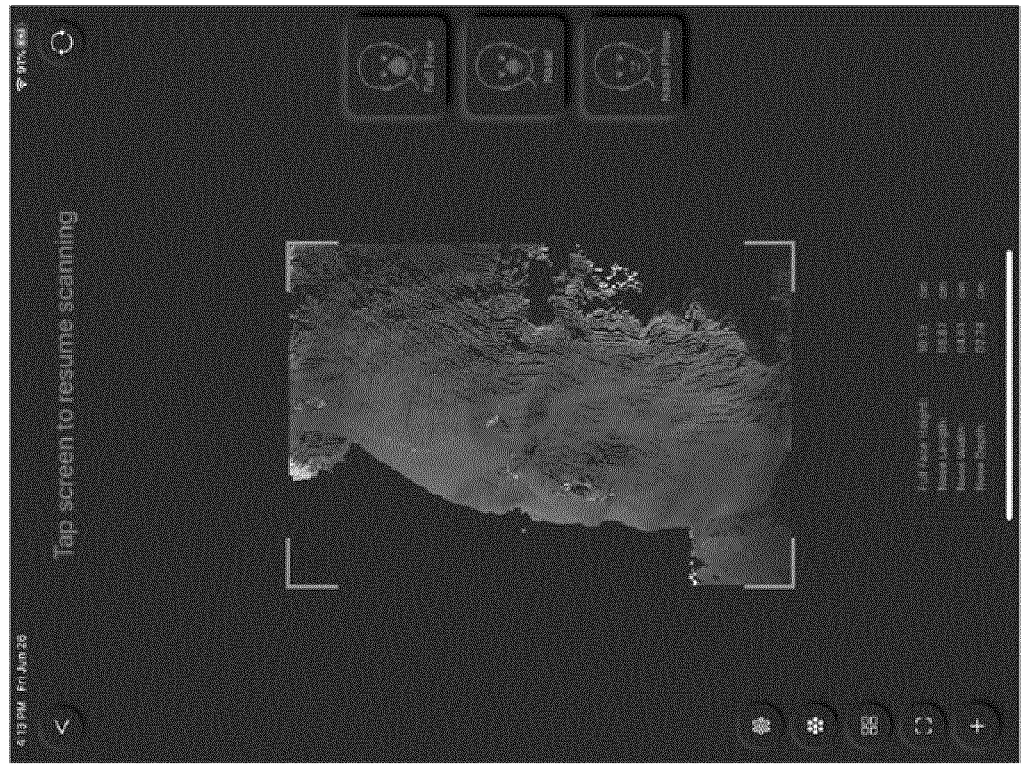
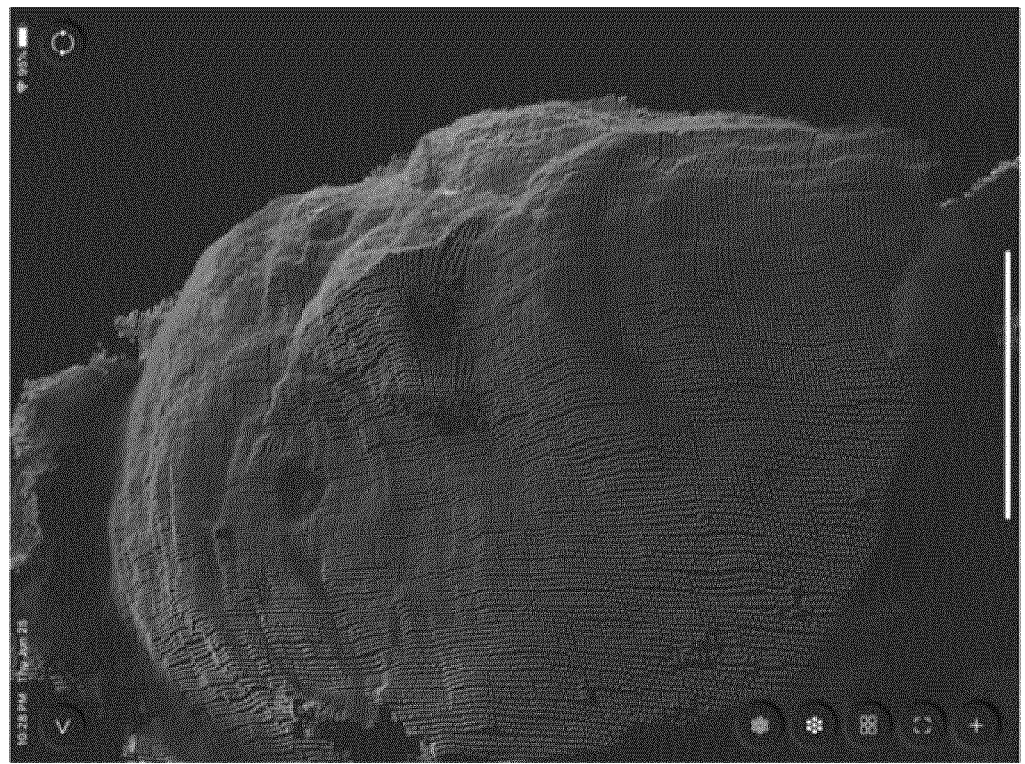
FIG. 7

```
private func estimateFaceScanFrameSize() -> CGRect { let frameSize: CGRect?

// Calculate parameters required for scanning frame var min_x = Float(10000.0)

var min_y = Float(10000.0)

var max_x = Float(-10000.0)

var max_y = Float(-10000.0)

for feature in features_Contour { let child = self.faceMeshNode!.childNode(withName: feature, recursively: false)

let child_Projected = self.facetrackingView.projectPoint(self.faceMeshNode!.convertPosition(child!.position, to: nil))

if child_Projected.x < min_x { min_x = child_Projected.x

} if child_Projected.y < min_y { min_y = child_Projected.y

} if child_Projected.x > max_x { max_x = child_Projected.x

} if child_Projected.y > max_y { max_y = child_Projected.y

}

} let offset_x = (max_x - min_x) / 8 let offset_y = (max_y - min_y) / 5 frameSize = CGRect(x: CGFloat(min_x - offset_x), y: CGFloat(min_y - (offset_y * 1.6)), width: CGFloat(max_x - min_x + offset_x * 2.0), height: CGFloat(max_y - min_y + offset_y * 2.0))

return frameSize!

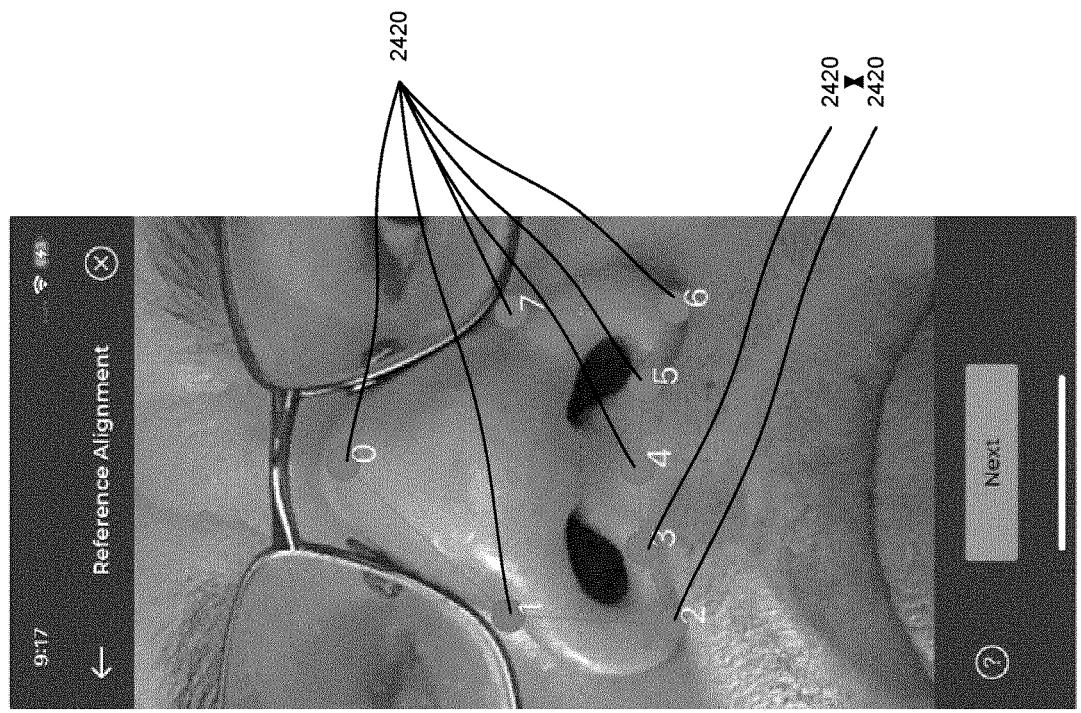
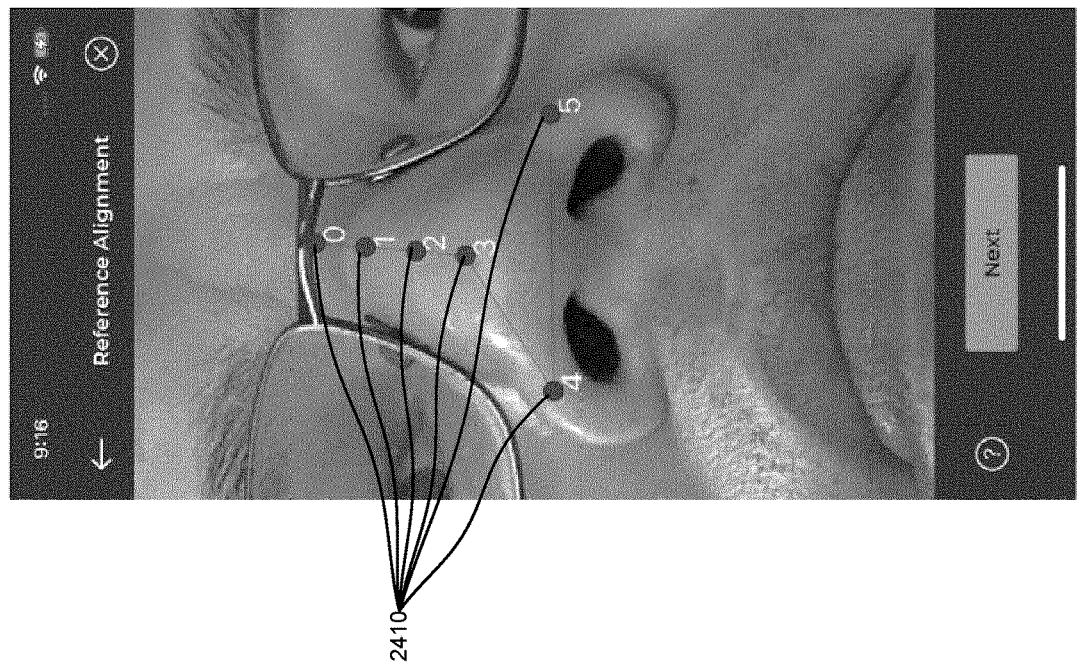
FIG. 24B
FIG. 24A

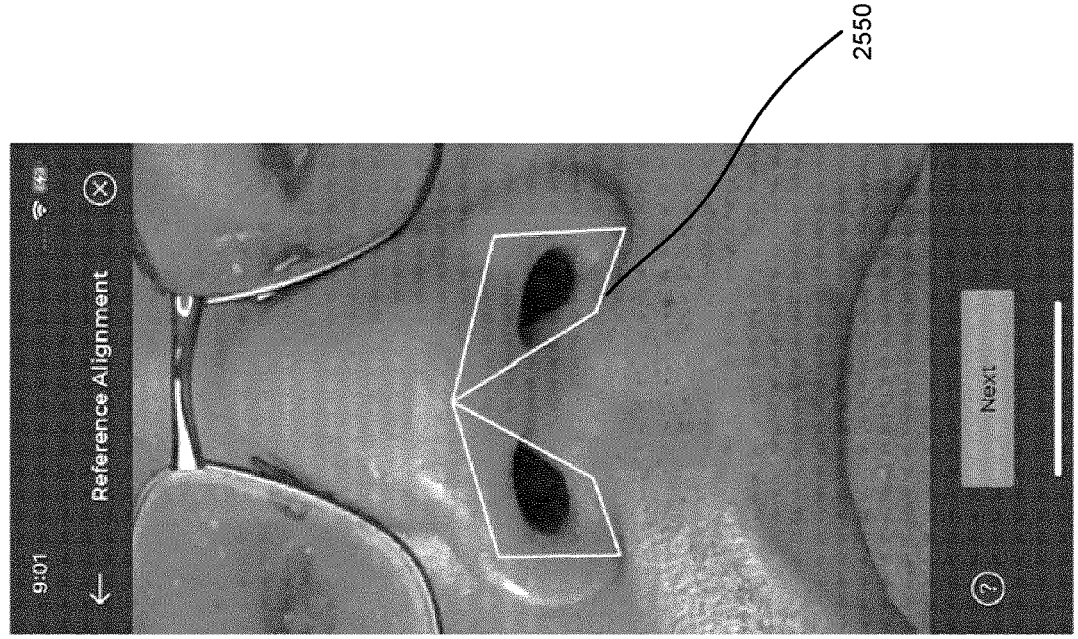
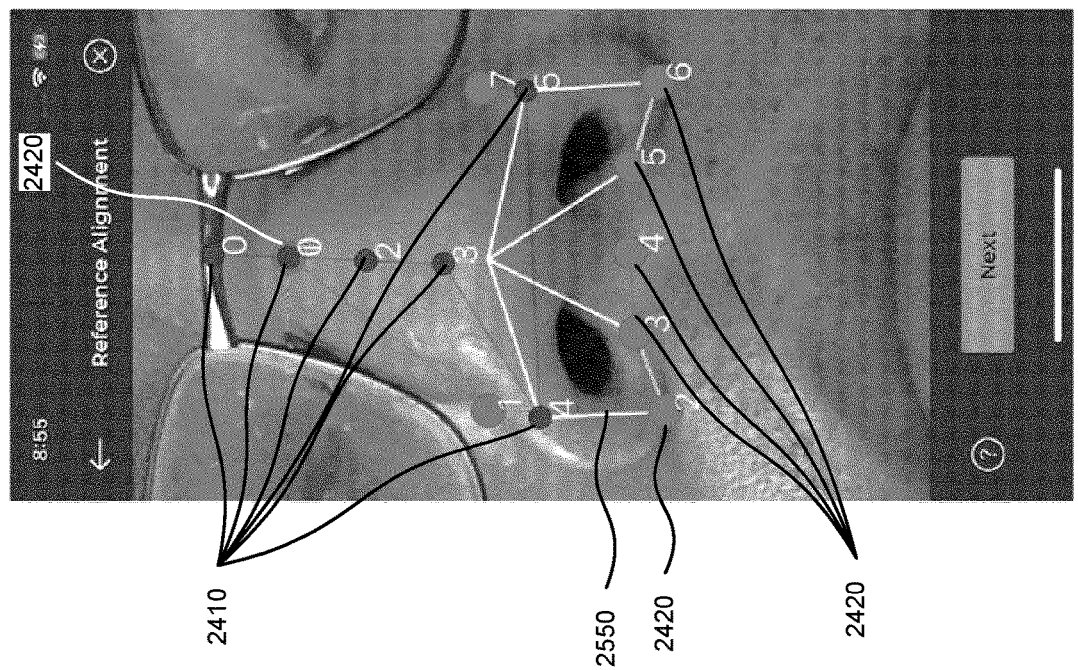
FIG. 25B
FIG. 25A

FIG. 33

| | Standard Full Face Mask | Under Nose Full Face Mask | Over the Head Full Face Mask | Standard Nasal Mask | Under Nose Nasal Mask | Over Head Nasal Mask | Standard Nasal Pillow Mask | Over the Head Nasal Pillow Mask |
|---|---|---|---|---|---|---|---|---|
| Fixed CPAP Pressure >10 | 1 | 0 | 0 | 3 | 0 | 0 | 2 | 0 |
| Fixed BiPAP Pressure >10 | 2 | 0 | 0 | 3 | 1 | 0 | 1 | 1 |
| Fixed CPAP Pressure <=10 | 1 | 1 | 1 | 3 | 3 | 1 | 3 | 3 |
| Fixed BiPAP Pressure <=10 | 1 | 0 | 0 | 3 | 0 | 0 | 2 | 1 |
| Auto CPAP/BiPAP Ave Pressure >10 | 1 | 0 | 0 | 3 | 0 | 0 | 2 | 0 |
| Auto CPAP/BiPAP Ave Pressure <=10 | 1 | 1 | 1 | 3 | 3 | 1 | 3 | 3 |
| ASV (not pressure dependent) | 3 | 1 | 1 | 2 | 1 | 1 | 1 | 1 |
| Deviated Septum | 1 | 2 | 1 | 1 | 3 | 1 | 2 | 1 |
| Nasal Congestion | 3 | 3 | 1 | 1 | 1 | 1 | 2 | 1 |
| Seasonal Allergies | 3 | 3 | 1 | 1 | 1 | 1 | 2 | 1 |
| Prone | 0 | 0 | 1 | 1 | 1 | 1 | 3 | 1 |
| Back | 1 | 2 | 1 | 3 | 3 | 1 | 3 | 1 |
| Side | 1 | 1 | 1 | 2 | 2 | 1 | 3 | 1 |
| Restless | 0 | 0 | 1 | 1 | 1 | 1 | 3 | 1 |
| Beard | 0 | 0 | 0 | 1 | 1 | 1 | 3 | 1 |
| Mustache | 2 | 2 | 1 | 1 | 2 | 1 | 3 | 1 |
| Skin Sensitivities | 1 | 1 | 1 | 2 | 2 | 1 | 3 | 1 |
| Claustrophobic | 0 | 1 | 1 | 1 | 2 | 1 | 3 | 1 |

FIG. 34

SYSTEMS AND METHODS OF ADAPTIVELY GENERATING FACIAL DEVICE SELECTIONS BASED ON VISUALLY DETERMINED ANATOMICAL DIMENSION DATA

CROSS-REFERENCE TO RELATED APPLICATIONS

This claims the benefit of U.S. Provisional Patent Application No. 63/166,723, filed on Mar. 26, 2021, the entire contents of which are incorporated by reference.

FIELD

Embodiments of the present disclosure relate to the field of facial devices, and in particular to adaptively generating facial device selections.

BACKGROUND

Facial devices or garments may be positioned adjacent a user's nasal and/or oral cavity for a specified function. For example, a facial mask may be positioned adjacent a user's nasal and/or oral cavity to a provide a physical barrier between a user's environment and the user's respiratory system. In another example, a facial mask of a continuous positive airway pressure (CPAP) machine may be positioned adjacent a user's nasal (e.g., atop the user's nose) and/or the user's oral cavity (e.g., atop the user's mouth) as an interface for providing air pressure to a user's nose and/or mouth as the user sleeps. Other example facial devices may be contemplated. In some scenarios, facial device efficacy may be correlated with how well the facial device fits the user's face.

SUMMARY

In one aspect, the present disclosure provides a computing device for adaptively generating facial device selections based on visually determined anatomical dimension data. The device may include a processor and a memory coupled to the processor. The memory may store processor-executable instructions that, when executed, configure the processor to: receive image data representing a user face; determine anatomical dimension data associated with a nasal-oral region of the user face based on the received image data; generate one or more facial device recommendations based on a recommendation model and the anatomical dimension data, the recommendation model defined based on a Bayesian-based scoring metric; and provide the one or more facial device recommendations for display at a user interface.

In another aspect, the present disclosure provides a method for adaptively generating facial device selections based on visually determined anatomical dimension data. The method may include: receiving image data representing a user face; determining anatomical dimension data associated with a nasal-oral region of the user face based on the received image data; generating one or more facial device recommendations based on a recommendation model and the anatomical dimension data, the recommendation model defined based on a Bayesian-based scoring metric; and providing the one or more facial device recommendations for display at a user interface.

In another aspect, a non-transitory computer-readable medium or media having stored thereon machine interpretable instructions which, when executed by a processor may cause the processor to perform one or more methods described herein.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the present disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIGS. 3 to 5 illustrate sample programming code, in accordance with embodiments of the present disclosure;

FIG. 6 illustrates sample objects inheritance table, in accordance with embodiments of the present disclosure;

FIGS. 7 to 9 illustrate 3D point cloud rendering, in accordance with embodiments of the present disclosure;

FIG. 11 illustrates sample programming pseudocode, in accordance with embodiments of the present disclosure;

FIGS. 24A, 24B, 25A, 25B, 26, 27A, and 27B illustrate RGB images for determining data representing facial features, in accordance with embodiments of the present disclosure;

FIGS. 31 to 33 illustrate user interfaces for providing facial device recommendations, in accordance with embodiments of the present disclosure;

FIG. 34 is an example table depicting scores assigned to each facial device type for patient attributes and clinical patient data;

DETAILED DESCRIPTION

Systems and methods of adaptively generating facial device selections based on visually determined anatomical dimension data are described in the present disclosure. For ease of exposition, embodiments of the present disclosure may be illustrated based on examples relating to a facial device associated with positive airway pressure (PAP) devices. PAP devices may include Continuous Positive Airway Pressure (CPAP), Bi-Level, or BiPAP machines, Non-Invasive Ventilators (NIV), and Adaptive Servo Ventilators (ASV). A PAP machine may be configurable to provide a flow of air pressure to a user's nose or mouth while the user is sleeping. Such flow of air pressure to the user's nose or mouth may assist with keeping the user's airway open, thereby assisting with normal breathing. Examples of such facial devices may be an interface between the PAP device and the user's respiratory system, and a combination of fit and comfort contribute to optimal operation of such facial devices.

In some scenarios, there may be several different types or manufacturers of PAP devices. The respective manufacturers of PAP devices may be associated with facial devices having unique features directed to delivering air pressure to the user's nose or mouth. As fit and comfort of the facial device to a particular user may be important considerations associated with use of the PAP device, there may not be a one-size fits all mask device. It may be beneficial to provide systems and methods for dynamically generating facial device recommendations to respective users.

The present disclosure describes examples associated with facial devices associated with PAP devices; however, systems and methods for dynamically providing recommendations for other types of facial devices may be contemplated. For example, embodiments of systems and methods described herein may be for dynamically providing recommendations for respirator mask device fitting (e.g., N95 mask fitting), head gear device fitting, or the like, among other examples.

Figure 1:
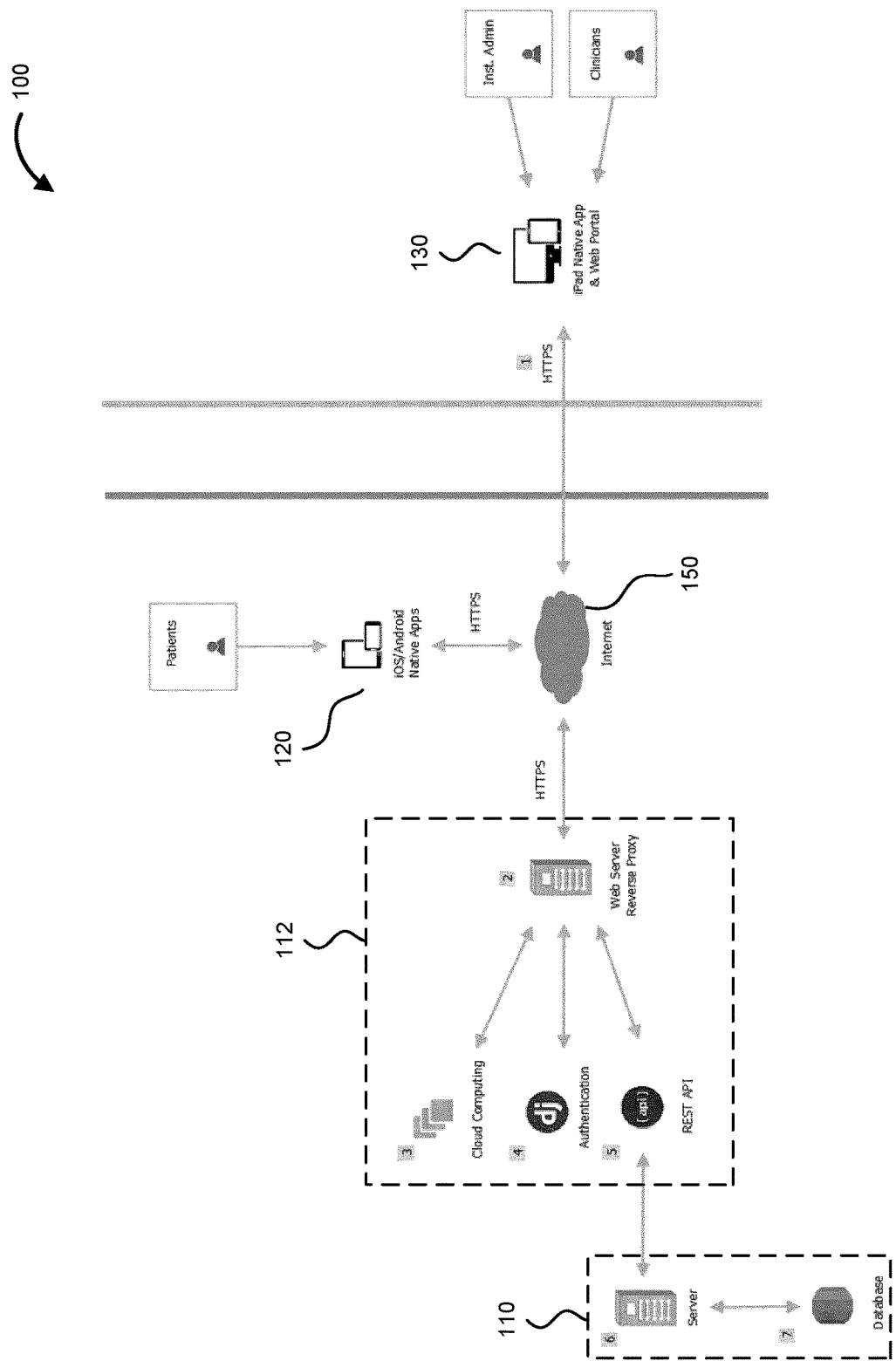
FIG. 1 illustrates a system platform, in accordance with embodiments of the present disclosure.

Reference is made to FIG. 1, which illustrates a system platform 100, in accordance with embodiments of the present disclosure. The system platform 100 may include a plurality of computing devices transmitting or receiving, via a network 150, data messages to or from other computing devices.

In some embodiments, the system platform 100 may be configured for dynamically generating facial device recommendations based on one or more of quantitative data or qualitative data. In some embodiments, quantitative data may include obtained image data associated with a prospective user of a facial device. In some scenarios, the image data may represent anatomical dimensional data associated with a user. For example, anatomical dimensional data may provide a distance between a user's nostrils, the width or length of a user's nose, width of a user's face, among other examples. As will be described in the present disclosure, the system platform 100 may include applications for dynamically determining quantitative data based on obtained image data.

In some embodiments, quantitative data may include data associated with facial device specifications retrieved from a client device or a service provider devices. For example, facial device specifications may include PAP device tuning parameters obtained via one or more service provider devices.

In some scenarios, a substantially exact fit may not lead to optimal comfort and operation for all users. In some embodiments, qualitative data may include data associated with user feedback data associated with facial device categories or anatomical data categories. For example, a category of facial device users having a nostril-to-nostril distance of approximately 0.5 centimeters may not all be suitably fitted for a given facial device. Accordingly, in some embodiments, the system platform 100 may dynamically generate facial device recommendations based on one or a combination of quantitative data or qualitative data.

The system platform 100 may include a plurality of computing devices, such as a server 110, a web interface platform 112, one or more client devices 120, or one or more service provider devices 130.

The one or more client devices 120 may be associated with respective facial device users. For example, a mask device user may be a user of a PAP device. To provide a facial device user with an optimally sized facial device for function and comfort, among other attributes, it may be beneficial to generate recommendations to the facial device user. The recommendations may be a subset of facial devices recommended based on qualitative or quantitative data associated with the facial device user, prior facial device recommendations associated with users having substantially similar anatomical features as the facial device user, or facial device configuration specifications provided by a service provider user (e.g., clinician, technician, among other examples). For example, qualitative or quantitative data may include measurement data associated with a user's facial features, user demographic data, clinical data, PAP machine device setting data, data representing prior user satisfaction, user preference data (e.g., data representing prior satisfaction of a given user), or data representing dimensions associated with facial devices.

In some embodiments, the one or more client devices 120 may be configured to receive, via a user interface, user data for providing mask device recommendations. For example, user data may include user demographic data, user preference data, PAP therapy prescription data, among other examples.

In some embodiments, the one or more client devices 120 may be configured to capture, via an image capture device, image data associated with the mask device user. The one or more client devices 120 may conduct operations for extracting anatomical feature data based on the image data. The one or more client devices 120 may transmit the extracted anatomical feature data and user data to the server 110 such that operations for mask device recommendation may be conducted.

The one or more service provider devices 130 may be associated with clinician or technician users. In the present example clinician or technician users may include healthcare professionals engaged for providing medical care or therapy to the facial device users. The one or more service provider devices 130 may be configured to receive, via a user interface, clinician data regarding the facial device user or a therapy plan associated with the facial device user. In some embodiments, the one or more service provider devices 130 may receive patient management data, including desirable facial device specification data.

In some embodiments, the server 110 may receive, via the network 150, user data or clinician data as inputs for generating mask device recommendations based on a facial device recommendation model. The server 110 may include machine learning architecture for conducting operations for generating one or more facial device recommendation models and for generating facial device recommendations based on a combination of data sets representing qualitative and quantitative data. In some embodiments, the server 110 may be based on an Amazon™ Relational Database Service (RDS) accessible via application programmable interfaces.

In some embodiments, the server 110 may include a memory, including a one or a combination of computer memory, such as random-access memory, read-only memory, electro-optical memory, magneto-optical memory, erasable programmable read-only memory, electrically-erasable programmable read-only memory, ferroelectric random-access memory, or the like. In some embodiments, the memory may be storage media, such as hard disk drives, solid state drives, optical drives, or other types of memory.

The memory may include or store a database structure. The database structure may store data records received from one or more client devices 120 or service provider devices 130. In some embodiments, the database structure may include large data sets representing prior mask device recommendation results.

In some embodiments, data sets may be managed based on features of a PostgreSQL12 database. PostgreSQL may be an open source object-relational database system that uses or extends the SQL language in combination with features for storing and scaling large data set operations. PostgreSQL may manage internal security on a per-role basis. In some examples, a role may be associated with a user, or a group (e.g., a role of which other roles may be members). In some scenarios, permissions may be granted or revoked on a database column level of granularity, and may allow/prevent creation of new objects within the database structure, schema, or table levels of granularity.

In some embodiments, the server 110 may transmit or receive data to/from other computing devices via a interface platform 112. For example, the interface platform 112 may be a Django based platform. The Django platform may include security features configured to counter potential data security threats associated with transmission or receipt of data among a plurality of computing devices. In some other examples, the interface platform 112 may be configured based on PHP scripting for implementing features to counter potential data security threats.

In some embodiments, the interface platform 112 may be based on features such as cross-site scripting protection, cross-site request forgery protection, SQL injection projection, clickjacking protection, or safe password hash, among other examples.

The network 150 may include a wired or wireless wide area network (WAN), local area network (LAN), a combination thereof, or other networks for carrying telecommunication signals. In some embodiments, network communications may be based on HTTP post requests or TCP connections. Other network communication operations or protocols may be contemplated. In some embodiments, the network 150 may include the Internet, Ethernet, plain old telephone service line, public switch telephone network, integrated services digital network, digital subscriber line, coaxial cable, fiber optics, satellite, mobile, wireless, SS7 signaling network, fixed line, local area network, wide area network, or other networks, including one or more combination of the networks.

In some embodiments, the one or more client devices 120 may store and execute a facial device application. Embodiments of the facial device application may be configured for a mobile device operating system, such as iOS™ or Android™.

In some examples, native iOS™ applications may be based on a SwiftUI framework. In some examples, native Android™ applications may be based on Java™ and OpenCV/MLKit. In some examples, one or more applications may be developed based on React JS, a JavaScript library package for generating user interfaces or user interface components.

In some embodiments, the one or more client devices 120 may include an image capture device and may be configured to capture image data of a facial device user. As will be described in the present disclosure, embodiments of the facial device recommendation application may generate facial device recommendations based on determined anatomical dimensions (e.g., dimensions of the user's face) from captured image data.

In some embodiments, the one or more servers 110 may store data sets for generating and training the facial device recommendation models. In some embodiments, the facial device recommendation models may generate facial device recommendations based on an input data set associated with a facial device user. For example, the input data set may include anatomical dimension data. In some embodiments, anatomical dimension data may include data representing face height, nose height, nose width, nose depth, nostril height, or nostril width, among other examples. In some examples, the input data set may include user demographic data, user preference data, or other user input received from the client device 120. In some embodiments, the input data set may include CPAP therapy prescription data or clinician provided data received from the service provider device 130.

In some embodiments, the server 110 may generate recommendation models may be based on deep learning neural networks trained based on big data sets.

In some embodiments, it may be beneficial to reduce quantity of personally identifiable information (PII) being transmitted via the network 150. PII may include user data or user images associated with facial device users. In some embodiments, operations for capturing image data and for generating anatomical dimension data based on the captured image data may be conducted locally at the one or more client devices 120. The one or more client devices 120 may subsequently transmit aggregated or a subset of the mask device user's data to the server 110 for generating mask device recommendations. The one or more client devices 120 may not store in persistent memory any of the image data, three-dimensional models based on the image data, or anatomical dimensions associated with the facial device user.

In some embodiments, the client devices 120 or service provider devices 130 may be unable to directly access data sets or data records stored at the server 110. Client devices 120 or service provider devices 130 may transmit to the server 110 requests for data retrieval and data modification, and the server 110 may be configured to validate and generate responses to such requests. Such implementations may be based on a presumption that "front-end" devices, such as the client devices 120, may be unreliable or unsecured devices. Enacting rules governing the flow of data requests may ameliorate or reduce operations that may compromise data security or data integrity of the system platform 100.

In some embodiments, the client devices 120 or the service provider devices 130 may not directly transmit or access data stored at the server 110. Rather, the server 110 may be configured to receive data requests via application programmable interfaces, and may be configured to generate or modify data sets stored in the database structure or memory.

In some embodiments, data messages transmitted among the computing devices may be via the network 150 and the interface platform 112. In some embodiments, transmitted data messages may be based on the HTTPS (TLS ver. 1.2) protocol.

In some embodiments, the interface platform 112 may be a web interface platform based on a Nginx 1.19 reverse proxy server. In some embodiments, the interface platform 112 may include a cloud computing platform including Django 2.2 web application on Amazon EC2 (HTML, CSS, Javascript). In some embodiments, the interface platform 112 may include authentication processes based on Django session authentication. In some embodiments, the web interface platform 112 may include a representational state transfer (REST) application programmable interface (API) based on a Django REST Framework 3.10.

In some embodiments, data messages transmitted via the network 150 may be based on the HTTPS protocol having features for encrypting data messages. The protocol may be a Transport Layer Security (TLS version 1.2). The protocol may secure communications based on an asymmetric public key infrastructure. Data packets transmitted based on the HTTPS protocol may, even if intercepted, appear as nonsensical data to an unscrupulous or unintended user.

In some embodiments, the server 110 may be based on a Django 2.2 server. In some embodiments, the server 110 may include a database structure based on a PostgreSQL 12 database on Amazon RDS. In some scenarios, Amazon RDS may encrypt database structures based on managed encryption keys with the AWS Key Management Service (KMS). On a database instance executing with Amazon RDS encryption, data stored at rest in an underlying storage may be encrypted, as are automated backups, read replicas, or database snapshots. RDS encryption may be based on industry-standard AES-256 encryption algorithm for encrypting data.

It may be appreciated that the above-described examples are illustrations, and alternate features may be contemplated.

Facial device recommendations based predominantly on anatomical dimensions of a facial device user may not be suitable for addressing user fit, preferences, or a combination of qualitative features that may contribute to an optimally operating and fitting facial device. In some scenarios, optimal facial device functionality or facial device user comfort may be based on a combination both quantitative data (e.g., physical dimensions) and qualitative data (e.g., user preferences associated with material stiffness, how a mask sits on the user's face, among other examples). In some examples, qualitative data for generating facial device recommendations may include a user's demographic data (e.g., age, gender, ethnicity, geographical location, or the like) or clinical data (e.g., user's propensity to be sensitive to or experience nasal congestion, seasonal allergies, feeling claustrophobic, skin sensitives, or the like). In some embodiments, qualitative data may represent a user's preferred sleeping position. In some embodiments, quantitative data for generating facial device recommendations may include physical dimensions of the user's facial features, target PAP machine or facial device settings (e.g., minimum or maximum pressure settings), among other examples. As will be described in the present disclosure, the server 110, the one or more client devices 120, or the one or more service provider devices 130 may include a machine learning architecture for generating and refining facial device recommendations based on data sets representing a combination of prior mask device recommendations and user feedback.

Figure 2:
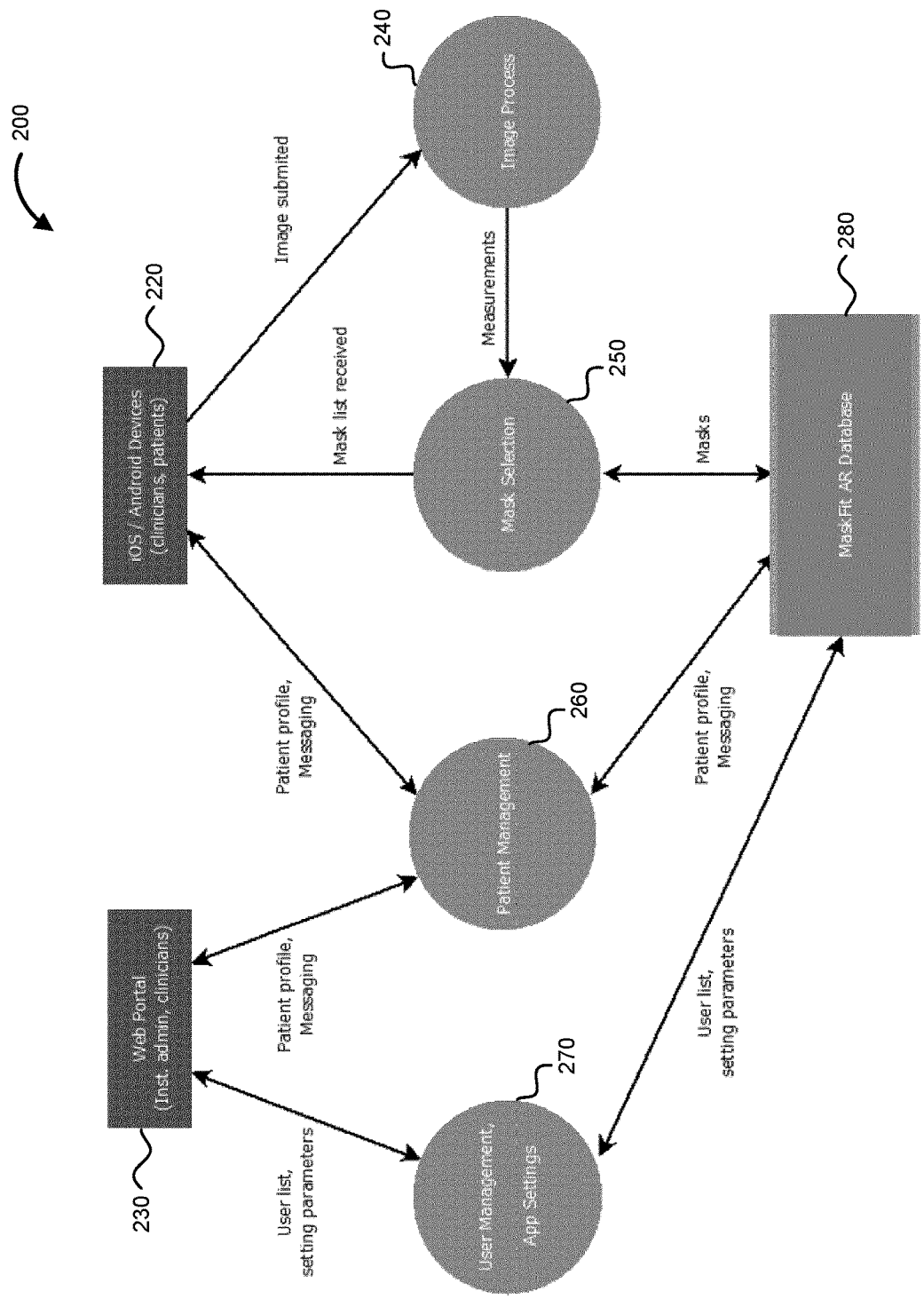
FIG. 2 illustrates a block diagram showing operations of the system platform of FIG. 1.

Reference is made to FIG. 2, which illustrates a block diagram 200 showing operations of the system platform 100 of FIG. 1, in accordance with embodiments of the present disclosure. Operations may be executed at one or more of the computing devices of the system platform 100. As an example, the computing devices 220 may include mobile devices operating mobile operating systems, such as iOS™ or Android™. In some embodiments, the one or more computing devices 220 may be the client device 120 or the service provider device 130 illustrated in FIG. 1. In some embodiments, the server 110 may include a secure storage for providing a database 280 (e.g., MaskFit AR™ Database).

In some embodiments, the one or more computing devices 220 may be configured to receive input data from a facial device user, a service provider user (e.g., clinician or technician providing medical care or therapy), or other user providing data pertinent to generating facial device recommendations for a facial device user.

In scenarios where a computing device 220 is associated with a facial device user, the computing device 220 may capture, via an image capture device, image data (e.g., photo) of the facial device user. The image data may be a photo may illustrate anatomical features, such as the user's nose, mouth, chin, cheeks, forehead, eyes, among other features.

In some embodiments, the computing device 220 may conduct image process operations 240 for determining anatomical dimension data associated with the facial device user. For example, the computing device 220 may determine face height, nose height, nose width, nose depth, nostril height, or nostril width, among other dimensions, based on the captured image data. In some embodiments, the image process operations 240 may be based on one or a combination of two-dimensional image data and three-dimensional point cloud data for identifying the anatomical dimension data.

In some embodiments, the computing device 220 may transmit the determined anatomical dimension data associated with the facial device user to the server 110 (FIG. 1). The server 110 may include a facial device application including operations for generating facial device recommendations 250 (e.g., one or more mask selections) based on trained facial device recommendation models and user input received from one or more computing devices 220. In some embodiments, the facial device recommendations 250 may be based on data sets stored at the database 280 and anatomical dimension data determined by image process operations 240.

The database 280 may include data sets storing features and attributes associated a plurality of facial devices. Features and attributes of facial devices may include facial device type, material type, dimensions, or the like. For example, facial devices may be categorized based on type, such as a full facial device, nasal fitting, nasal pillow device, or the like. The respective facial device types may be sub-categorized, such as being standard, "under-the-nose". In some examples, the respective facial device types may be sub-categorized as being over-the-head fitting devices or non-over-the-head fitting devices.

In some embodiments, the database 280 may include data representing prior user feedback data associated with the plurality of facial devices. User feedback may include quantitative (e.g., user star ratings) or qualitative (e.g., text-based comments) associated with prior facial device recommendations for users having particular facial dimensions, preferences, or the like.

In some scenarios, providing a user with a facial device based solely on matching physical dimensions of a given facial device with corresponding anatomical dimensions of a user's face may not necessarily lead to optimal facial device fit, comfort, and operation. For example, some facial device users of PAP devices may prefer particular types of facial device materials, such as silicon, plastic, or a combination of the same. In some other examples, some facial device users may prefer a facial device that may cover a larger or smaller portion of the face. In some other examples, some facial device users may prefer a facial device having a tighter or looser fit.

In some scenarios, despite having substantially similar anatomical dimensions, mask device users may have varying contoured faces or facial muscle firmness leading to differing experiences relating to fit, comfort, or facial device performance. According, in some embodiments, the server 110 may be configured to generate facial device recommendations based on machine learning operations or recommendation models. In some embodiments, the recommendation models may be based on data sets representing prior facial device user data, prior-generated facial device recommendations, prior facial device user ratings, or the like.

In some embodiments, the server 110 may conduct operations of the facial device application for generating facial device recommendations 250 and, subsequently, transmitting the facial device recommendations 250 to the computing device 220 for display at a user interface. The facial device recommendations 250 may include a subset of facial devices that may be optimal for the facial device user. In some embodiments, the facial device recommendations 250 may be a sorted list including a combination of a plurality of facial devices or sub-types.

In some embodiments, the facial device recommendations 250 may be based on user input received at the computing device 220. Such user input may include data representing a patient profile, clinician provided therapy requirements, user preferences, among other examples. In some embodiments, the facial device recommendations 250 may include Bayesian-based operations, such that recommendations may be based on data representing prior-received user feedback by the subject user or in combination with other facial device users having a similar user profile or similar anatomical facial structure.

In some embodiments, the server 110 may conduct operations for centralized patient management 260 and may receive data from one or more computing devices 220 or from interactive user interfaces 230. Such data may be stored at the database 280 (e.g., MaskFit AR™ Database).

For example, user input may include facial device user profile data, therapy prescription data, user messages, or other data associated with patient management operations 260. In some embodiments, the computing device 220 may receive facial device user input for creating a user profile or for communicating via messaging operations with a clinician user. In some embodiments, the computing device 220 may receive image data via an image capture device for determining anatomical dimension data associated with the facial device user. In some embodiments, the computing device 220 may receive data associated with responses to a facial device user questionnaire.

In some embodiments, a computing device 220 associated with a clinician device user may be configured to display, via a display interface, a facial device user's data and or receive data representing edits to the facial device user's data.

In some embodiments, a computing device 220 associated with a clinician device user may be configured to display, via a display interface, a facial device user's data and or receive data representing edits to the facial device user's data. In some embodiments, centralized patient management 260 may include operations for adding existing patient data for storage at the server 110, adding new patient data for storage at the server 110, obtaining data representing patient information based on a questionnaire, saving and modifying patient/user data, among other examples. In some embodiments, operations associated with centralized patient management 260 may include operations to provide remote consultations (e.g., video or audio) between a patient user and a clinician user. (e.g., akin to telemedicine platforms). In some embodiments, operations associated with centralized patient management 260 may include operations for accessing patient data and transmitting preliminary patient assessments to computing devices associated with patient users. Other operations for centralized patient management 260 may be contemplated.

In some embodiments, the system platform 100 may be configured to provide an interactive user interface 230, such as a web portal, on a computing device. In some embodiments, the interactive user interface 230 may be provided on any Internet-accessible computing device. In some embodiments, the interactive user interface 230 may be configured to receive input from therapy administrators, clinicians, or the like. In some embodiments, the interactive user interface 230 may be configured to receive patient profile data, provide messaging capability among users of the system platform 100, receive facial device user lists, among other examples.

In some embodiments, the server 110 may conduct operations for centralized facial device application management 270. For example, the server 110 may receive facial device user lists, data representing facial device parameters, or the like, and may conduct operations of user management and application setting 270.

Operations for providing facial device recommendations may be based at least in part on an anatomical structure of the facial device user. In some scenarios, clinicians may remotely provide therapy to patients. For example, clinicians providing therapy for sleep apnea may provide consultations to a patient for PAP devices. Providing a facial device user (e.g., patient) with a plurality of sample facial devices for testing may be time consuming or may be resource intensive (e.g., requiring numerous physical samples or requiring proper sanitation/cleaning). It may be beneficial to provide facial device recommendations based on image data representing a facial device user.

Operations for generating anatomical dimension data associated with a facial device user's face may include operations for facial recognition. Identifying facial features may be based on identifying a plurality of feature landmarks or a plurality of reference points. As it may be challenging in some scenarios to determine sufficient feature landmarks based on image data representing a two-dimensional data, it may be beneficial to provide image processing operations based on three-dimensional point cloud data based on received image data.

A client device 120 (FIG. 1) may be configured to receive, via an image capture device, one or more images of a facial device user. In some embodiments, the client device 120 may be configured to determine anatomical dimension data of the facial device user based on point cloud data associated with received image data.

In some embodiments, a point cloud may be a set of data points in three-dimensional space that may act as a reference/anchor point to facial features. The point cloud may include data points generated based on features that represent depth or perception through positioning within space and time. In some embodiments, the client device 120 may include an accelerometer device, and the client device may conduct operations based on accelerometer data for tracking movement of the facial device user within a space.

For ease of exposition, example operations in the Apple iOS™ operating system may be provided. Some examples of augmented reality (AR) operations (e.g., RealityKit framework, ARKit framework, SceneKit framework) may be unable to provide point cloud processing. For operations that may require increased data accuracy or three-dimensional geometry reconstruction, the above-described examples of AR operations may be unable to utilize direct point cloud rendering models based on image data captured from image devices providing a combination of visual data and real-time depth data (e.g., TrueDepth™ devices). As an example, face tracking models of the ARKit framework may include .line and .fill rendering modes, but may be unable to conduct operations based on depth data. It may be beneficial to provide systems and methods including a three-dimensional image data rendering engine to address some of the above-suggested challenges.

As described herein, one or more client devices 120 may include a facial device application including operations for determining anatomical dimension data based on image data of a facial device user. In some embodiments, the facial device application may include operations of a Metal™ framework. Metal™ may be a hardware-accelerated three dimensional graphic and compute shader application programming interface based on the Apple iOS™ platform. Metal may include functions akin to OpenGL or OpenCL. The Metal API may include operations for rendering three-dimensional graphics and for conducting data-parallel computations based on a graphics processor.

In some embodiments, the one or more client devices 120 may obtain, via an image capture device, image data representing anatomical features of a facial device user. The one or more client devices 120 may conduct operations of a three-dimensional rendering engine for determining anatomical dimension data associated with the facial device user.

In some embodiments, the three-dimensional (3D) rendering engine, disclosed as JMetalRenderer, may be an abstraction around a graphical processing unit. The 3D rendering engine may be a programming class for providing a device and command buffer. The 3D rendering engine may generate a single scene object that may be populated with content. In some embodiments, the 3D rendering engine may instantiate a plurality of other objects for generating anatomical dimension data.

Reference is made to FIG. 3, which illustrates sample programming code of a three-dimensional rendering engine, in accordance with embodiments of the present disclosure.

In some scenarios, a scene may include different root nodes to which related content may be added. In some embodiments, the 3D rendering engine may be based on at least four type nodes: system node, root node, depth node, and face node. In addition to storing the example node instances, operations of a scene programming class may store the node instances and clear colour. In some scenarios, the colour may be used for every new frame as a background. In some scenarios, the 3D rendering engine may store the camera in the scene, and the camera may be used to view the scene from a plurality of locations, similar to operating a camera in three dimensional space.

Reference is made to FIG. 4, which illustrates sample programming code of a JScene class, in accordance with embodiments of the present disclosure.

In some embodiments of the 3D rendering engine, a node may identify where in the world a mesh object should be rendered based on rotation, scaling, or translation transforms. For example, mesh may define a model in local space, and a node may include data representing operations for taking the local coordinates and mapping the coordinates to a position in 3D space. In some embodiments, the 3D rendering engine may include a hierarchical structure including childe nodes. In some embodiments, a mesh value may be optional, as a node need not be associated with a mesh.

In some embodiments, a programming class, disclosed as a JNode class, may represent operations for translating 3D local data to a point in real-world 3D space. A node may include a position, orientation, or scale property that may provide for movement of content in real-world 3D space. In some embodiments, the JNode class may include an optional mesh property. The mesh property may describe 3D data associated with the node. Nodes may include other child nodes to provide a scene hierarchy of transforms.

In some embodiments, a JDepthNode programming class may be a child of a JNode object, which may be used for directly rendering depth data as points in a Metal shader. To illustrate, reference is made to FIG. 5, which illustrates sample programming code of a JDepthNode programming class.

In some embodiments, the 3D rendering engine includes further programming classes for rendering objects. For example, a JMesh programming class may include 3D vertices data used for rendering objects. The JMesh programming class may include reference to material used to render models. A JMaterial programming class may define how a model is provided on a display screen (e.g., whether an object should be rendered in solid colour, textured, etc.). In some embodiments, the JMaterial programming class may be an abstraction of the vertex or fragment shader setup.

In some embodiments, a JTexture abstraction class may include MTLTexture and MTLSamplerState objects and may provide a helper method for loading new textures.

In some scenarios, the 3D rendering engine may include a camera for traversing a captured scene and for setting properties such as a field of view for controlling how zoomed in or zoomed out a captured scene may be. In some embodiments of the 3D rendering engine, features of a Perspective Projection may be provided. In some embodiments, features of an Orthographic projection may be provided based on creating a Camera protocol that may include features of a perspective camera and an orthographic camera. In some embodiments, the camera may provide a view matrix and a projection matrix property, and the matrices may be recalculated based on any changes to camera properties. Such matrices may be provided to vertex shaders with a uniform buffer.

In some embodiments, the 3D rendering engine may include a JMesh vertex data in combination with features for importing other models. In some scenarios, 3D model formats in real-world 3D space may include .obj, ply, .usd, or the like. In some embodiments, a Model I/O programming interface developed by Apple™ may be incorporated for importing and exporting data based on multiple formats.

In some embodiments, the Model I/O programming class may include a MDLAsset programming class including features for loading external data into Model I/O data structures. In scenarios where a MDLAsset programming class has been instantiated, a MetalKit programming class may create a MetalKit mesh MTKMesh. A MTKMesh may include operations to access MTLBuffer instances used to for rendering models.

Reference is made to FIG. 6, which illustrates a sample objects inheritance table for the custom 3D rendering engine disclosed herein, in accordance with embodiments of the present disclosure.

Figure 8:
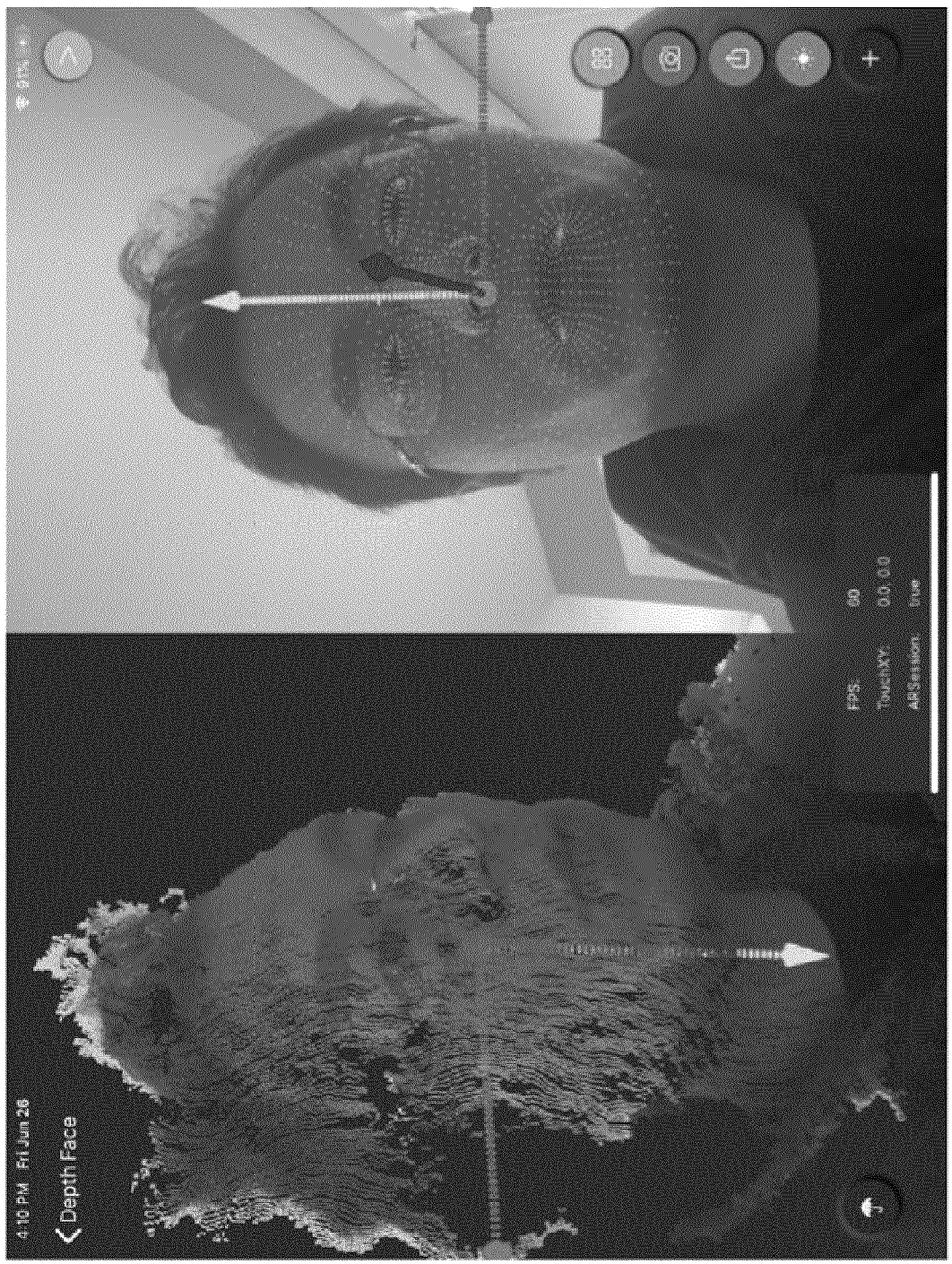
Figure 9:

Reference is made to FIGS. 7 to 9, which illustrate 3D point cloud renderings based on operations of above-described the 3D rendering engine, in accordance with embodiments of the present disclosure. FIGS. 7 to 9 illustrate example drawings representing test results of custom operations of a 3D rendering engine for 3D point cloud data. In some embodiments, image and depth data obtained from image capture devices (e.g., TrueDepth™ camera) may be processed for providing image data for determining anatomical dimension data for facial features.

In some scenarios, the one or more client devices 120 may capture image data representing a field of view of an image capture device. In iOS™-based augmented reality programming interfaces, operations for identifying and displaying the identification of a user's face may not be provided (e.g., ARKit™ framework in iOS™ may not include such functionality). It may be beneficial to conduct operations for generating in substantially real time a coarse grain capture of a user's face.

Figure 10B:
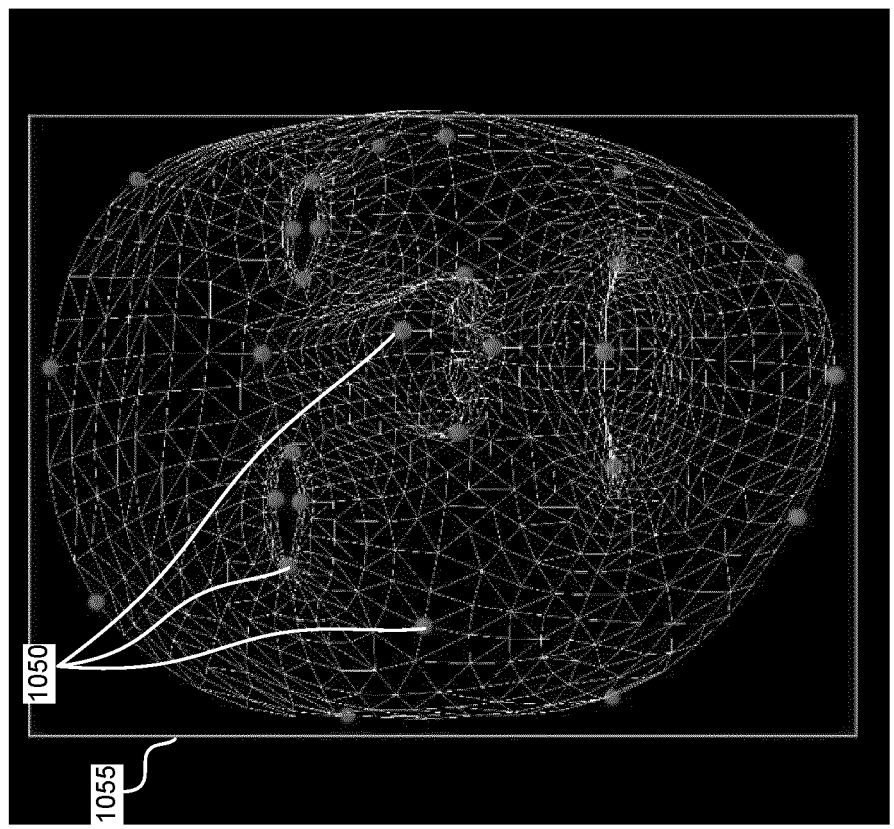
FIGS. 10A and 10B illustrate an outline identification of a user's face, in accordance with embodiments of the present disclosure.
Figure 10A:

Reference is made to FIGS. 10A and 10B, which illustrate an outline identification of a user's face within a captured image and a 3D point cloud representation of the identified outline, in accordance with embodiments of the present disclosure.

In some embodiments, the facial device application may include operations for detecting in substantially real time an outline of a user's face, and displaying the detected outline of the user's face on a display interface. As an example, in FIG. 10A, the facial device application may circumscribe the user's face with a polygon boarder, showing a front-view of the user's face.

In some embodiments, the facial device application may include operations for displaying 3D point cloud data associated with features of the user's face. As an example, in FIG. 10B, the facial device application may include visual markers identifying data representing contour or depth associated with features of the user's face.

In some embodiments, the facial device application may include operations for detecting a user's face based on captured image data. In some embodiments, a programming class disclosed as ARFaceGeometry may provide 3D geometric data or topological data associated with the user's face. In some embodiments, data markers 1050 in combination may represent or delineate contours of the user's face may be selectable and displayed at a user interface. In some embodiments, data points 1050 shown in a 3D space based on the ARFaceGeometry programming class may be translated to 2D pixel points for display on a user interface.

In some embodiments, the facial device application may include operations for determining a facial boundary marker 1055 based on 2D pixel points provided on a user interface. As an example, FIG. 11 shows sample programming pseudocode for determining a facial boundary marker 1055, in accordance with an embodiment of the present disclosure.

Figure 12B:
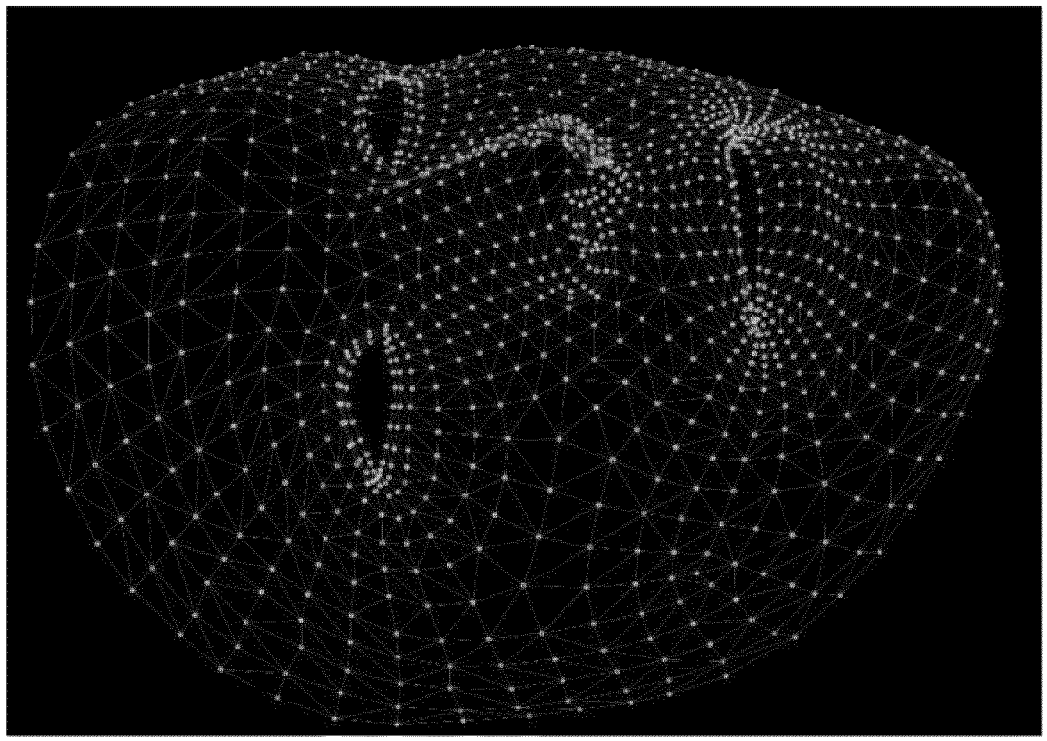
FIGS. 12A and 12B illustrate examples of visual data representing topology of a face, in accordance with embodiments of the present disclosure.
Figure 12A:
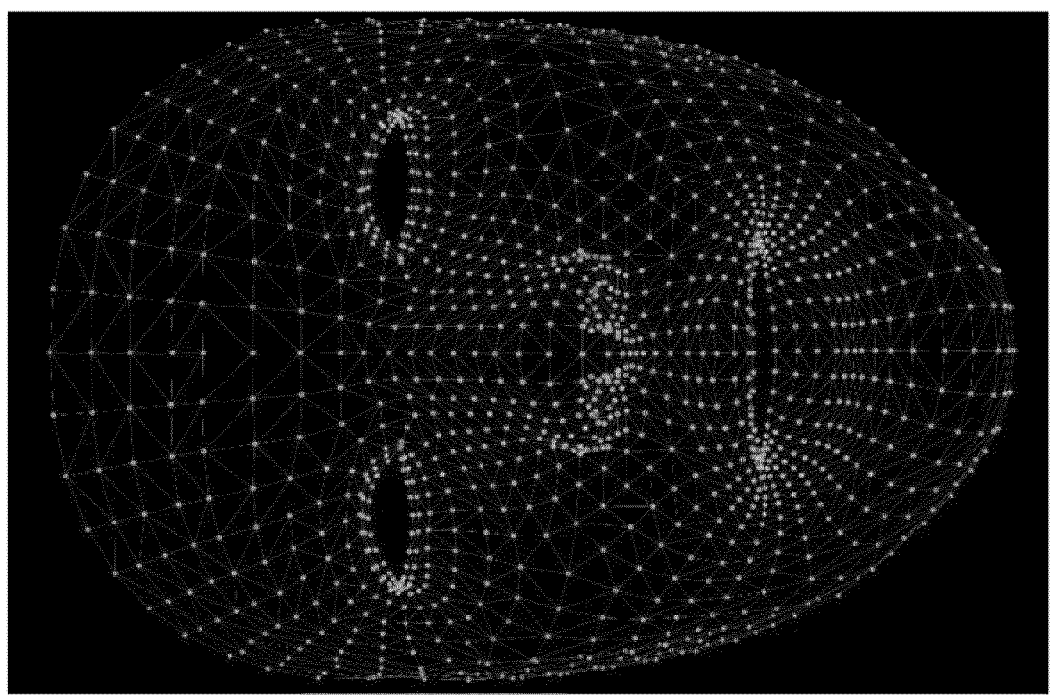

In some embodiments, the facial device application may include operations based on ARKit programming class (developed by Apple™). In scenarios when operations of ARKit determine that a unique face is identified based on obtained image data, operations of an ARSession programming class may provide an ARFAceAnchor object. The ARFaceAnchor may include data representing the pose, topology, or expression of a face. Further, a geometry property may represent an ARFaceGeometry object representing detailed topological data representing the user's face. FIGS. 12A and 12B illustrate examples of visual data representing the topology of a detected user's face.

In some embodiments, the ARFaceGeometry programing class may provide topological data representing a user's face in the form of a 3D mesh diagram. Topological data in the form of 3D mesh format may be suitable for rendering by a plurality of third-party technology or for export as 3D digital data.

In some embodiments, the facial device application may include operations for determining face geometry from an ARFaceAnchor object in a face-tracking AR session. During the face-tracking AR session, a facial model may determine dimensions, shape, or current expression of a detected face. In some embodiments, the ARFaceAnchor object be used to generate face mesh data based on stored shape coefficients, thereby providing detailed description of a face's current expression.

In an example AR session, the facial device application may utilize the models as a foundation for overlaying content based on contours of a user's face, such as for applying virtual makeup or tattoos. In some embodiments, the facial models may generate occlusion geometry objects for masking virtual content behind 3D shapes of the user's face.

Figure 13B:
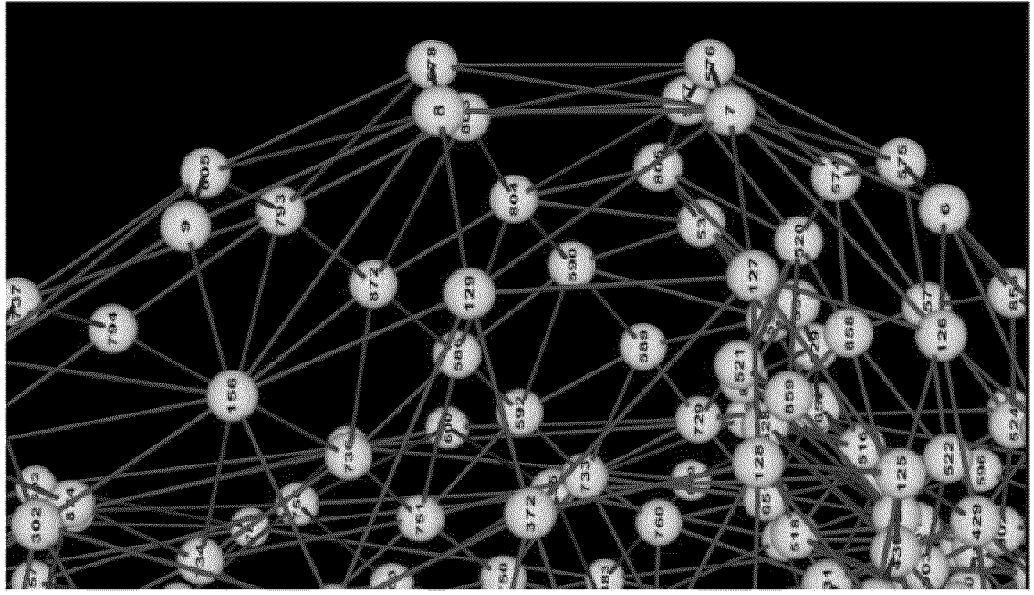
FIGS. 13A and 13B illustrate enlarged views of a 3D mesh model, in accordance with embodiments of the present disclosure.
Figure 13A:
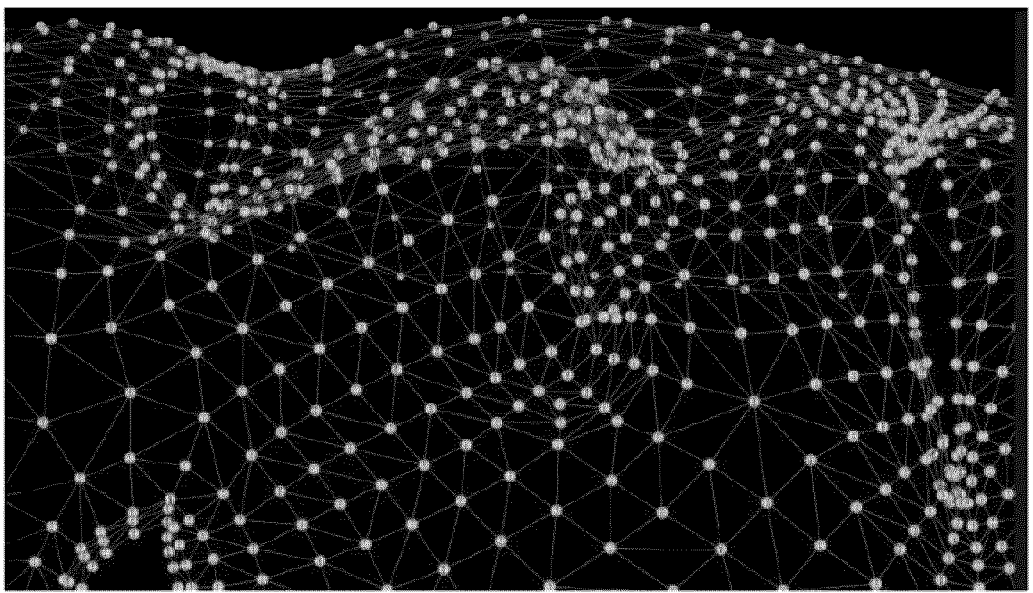

In some embodiments, the facial device application may determine facial features and generate data by point indices of a generic face tracking model. In some scenarios, vertex indices for the ARFaceGeometry programming class may be useful for generating facial geometry data. FIGS. 13A and 13B illustrate enlarged views of a 3D mesh model representing a user's face, in accordance with embodiments of the present disclosure. The enlarged views illustrates virtual vertex indices.

In some embodiments, the facial device application may include operations for detecting facial features or associated geometrical data based on the generated vertex indices. As an example, the ARFaceGeometry programming class described herein includes 1220 vertices based on the ARKit framework. Referring again to FIG. 10B, the outline identification of a user's face illustrates vertex indices based on operations of the ARFaceGeometry programming class. For example, the facial device application may include operations for generating automatic 3D sensing measurement data based on an ARFaceGeometry generic face tracking model for a full face or nasal structure.

In some embodiments, the facial device application may include operations for determining head pose based on 3D point cloud data representing a user's head dynamically or in substantially real time. Operations for head pose estimation may be executed as pre-processing operations for facial feature recognition. In some embodiments, operations for head pose estimation may include detecting pronasale points based on convex hull points of 3D point data.

Figure 14:
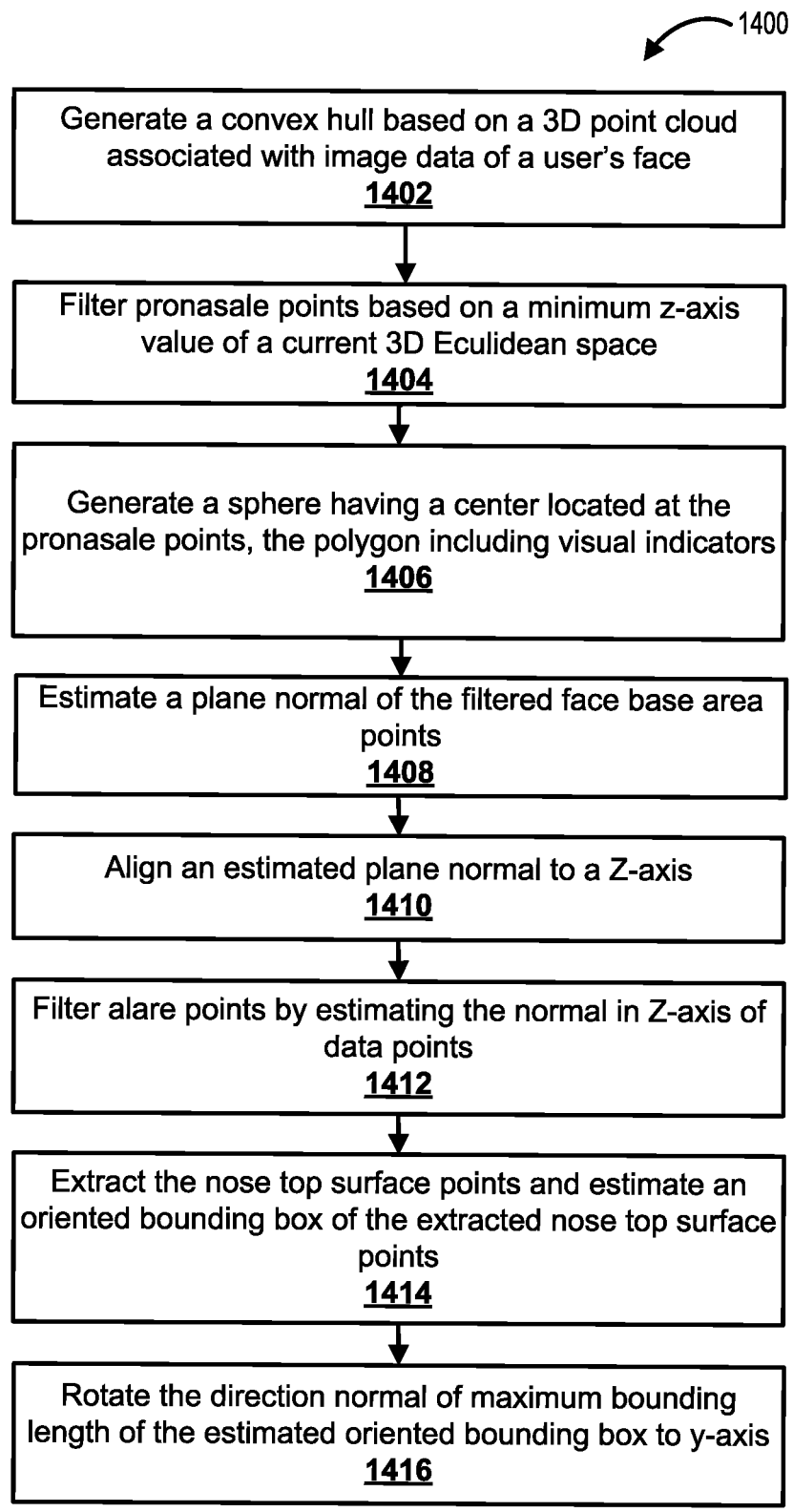
FIG. 14 illustrates a method of estimating head pose based on image data, in accordance with embodiments of the present disclosure.

Reference is made to FIG. 14, which illustrates a method 1400 of estimating head pose based on image data, in accordance with embodiments of the present disclosure. The method 1400 may be executed by the processor of one or more computing devices described in the present disclosure. In some embodiments, processor-readable instructions may be stored in memory and may be associated with a facial device application of one or more client devices 120 (FIG. 1). The method 1400 may include operations such as data retrievals, data manipulations, data storage, or the like, and may include other computer-executable operations.

Figure 15B:
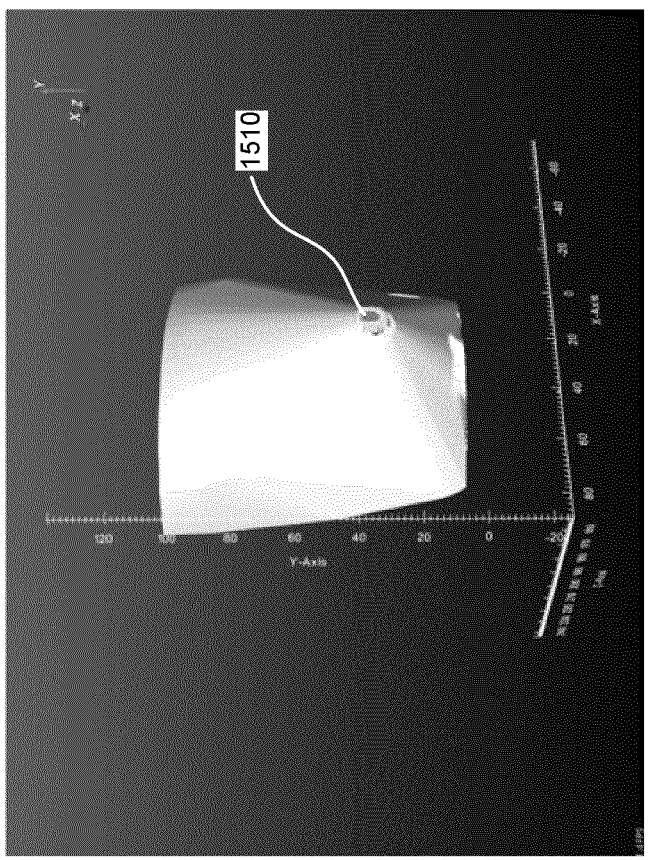
FIGS. 15A, 15B, 16A, 16B, 17A, 17B, 18A, 18B, 19 to 21, 22A, and 22B illustrate images based on 3D point cloud data associated with facial features, in accordance with embodiments of the present disclosure.
Figure 15A:
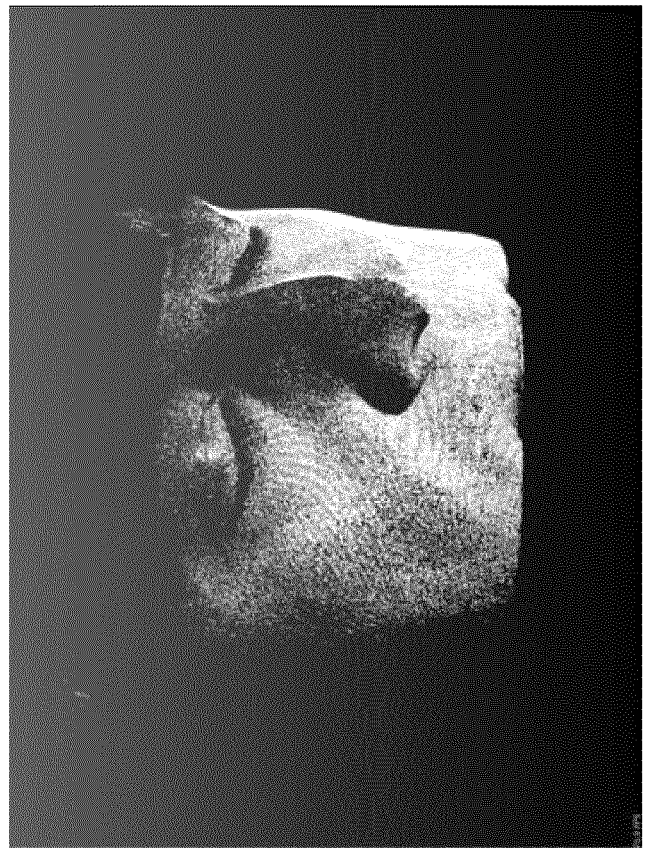

At operation 1402, the processor may generate a convex hull based on a 3D point cloud associated with image data of a user's face. For illustration, FIG. 15A illustrates a 3D point cloud associated with image data of a user's face. FIG. 15B illustrates a generated convex hull based on the 3D point cloud shown in FIG. 15A.

At operation 1404, the processor may filter pronasale points 1510, generally shown in FIG. 15B based on a minimum z-axis value of a current 3D Euclidean space. To illustrate, in some scenarios, a tip of the convex hull may correspond to pronasale points for a typical human face. Subsequent to constructing a convex hull, the processor may identify data points having the lowest z-axis coordinate (e.g., where the z-axis may represent depth) and determine that the identified data points represent a nose tip.

Subsequent to identifying a pronasale point, the processor, at operation 1406, may generate a polygon volume or sphere having a center located at the pronasale point. In some embodiments, the center may be a centroid of the pronasale data points. The processor may generate visual indicators to identify the polygon or spherical shape 1610. In some scenarios, the polygon or sphere may be another shape, depending on the anatomical shape of the user's face.

Figure 16A:
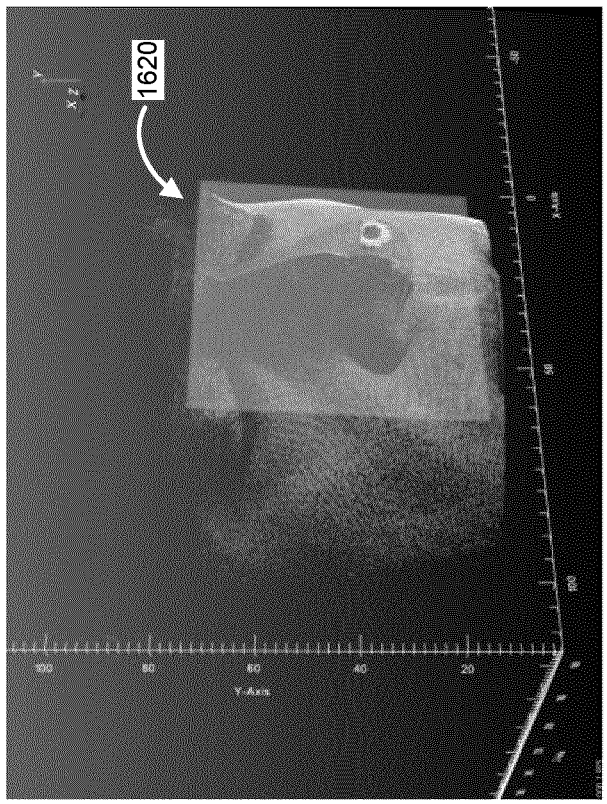
Figure 16B:
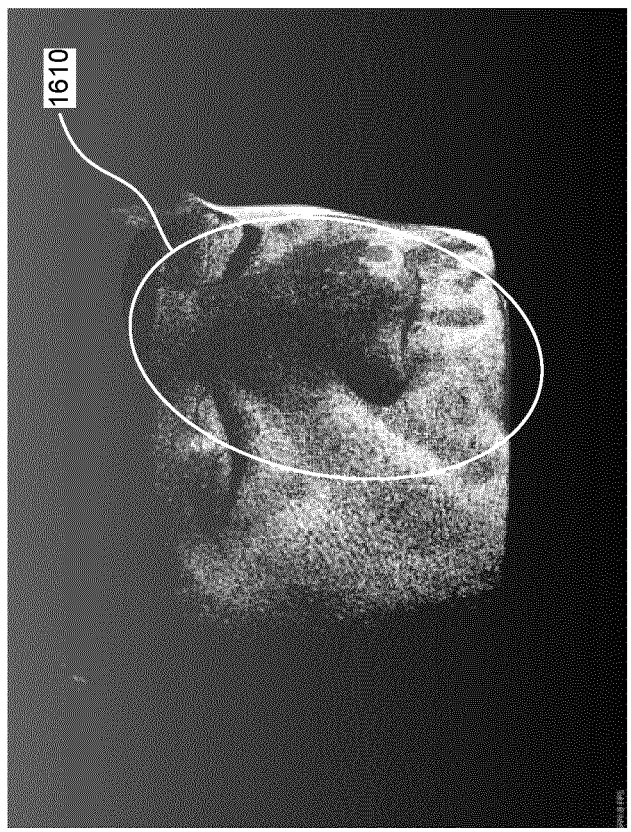

At operation 1408, the processor may estimate a plane normal 1620, as illustrated in FIG. 16B, of the above-described filtered face base area points 1610. For example, FIG. 16B illustrates an estimated face X-Y plane.

Figure 17B:
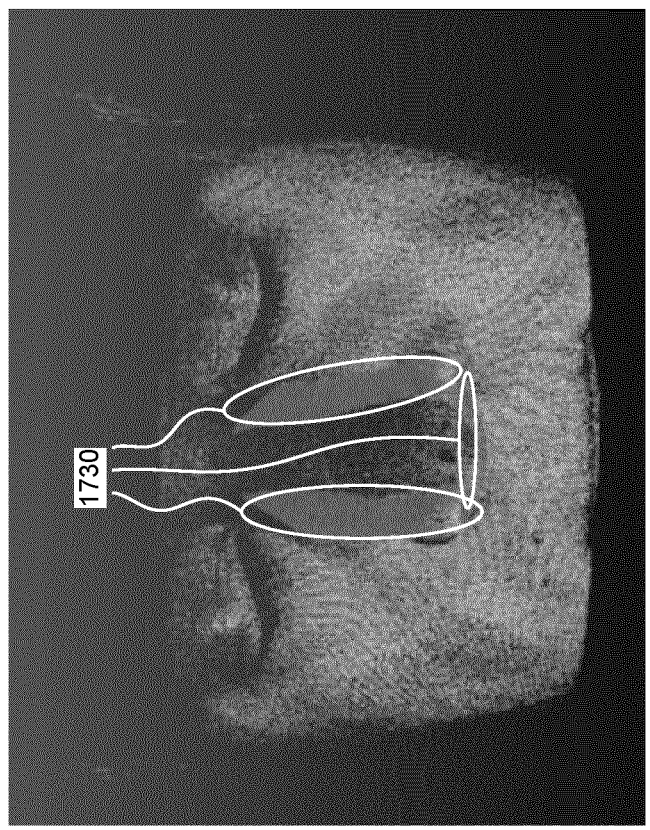
Figure 17A:
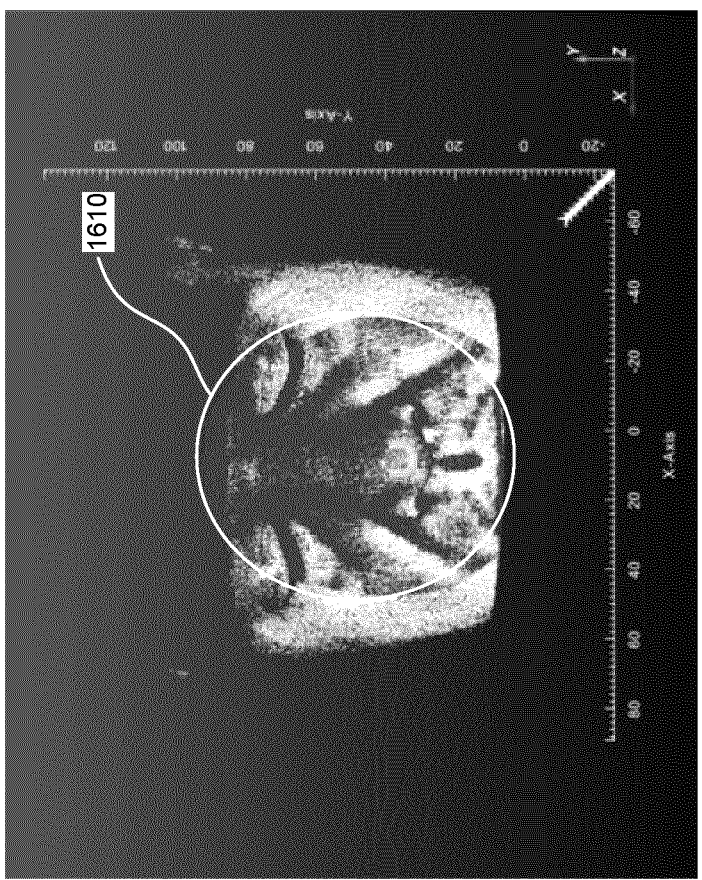

At operation 1410, the processor may align an estimated plane normal to a Z-axis, as illustrated in FIG. 17A. In particular, FIG. 17A illustrates a front view aligned to the Z-axis.

At operation 1412, the processor may filter alare points 1730 (FIG. 17B) by estimating the normal in Z-axis of data points. In particular, FIG. 17B illustrates estimated alare points set.

Figure 18A:
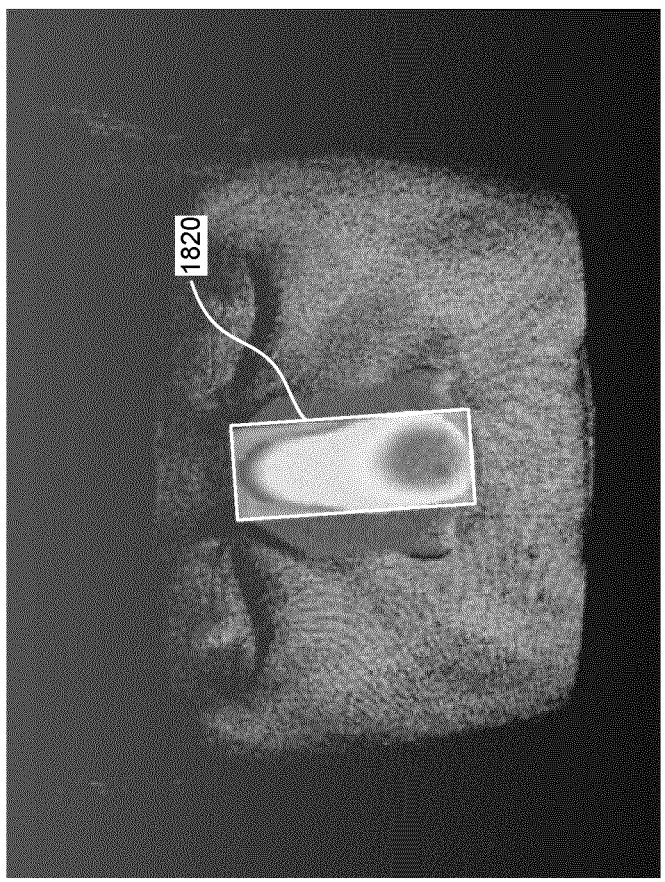
Figure 18B:
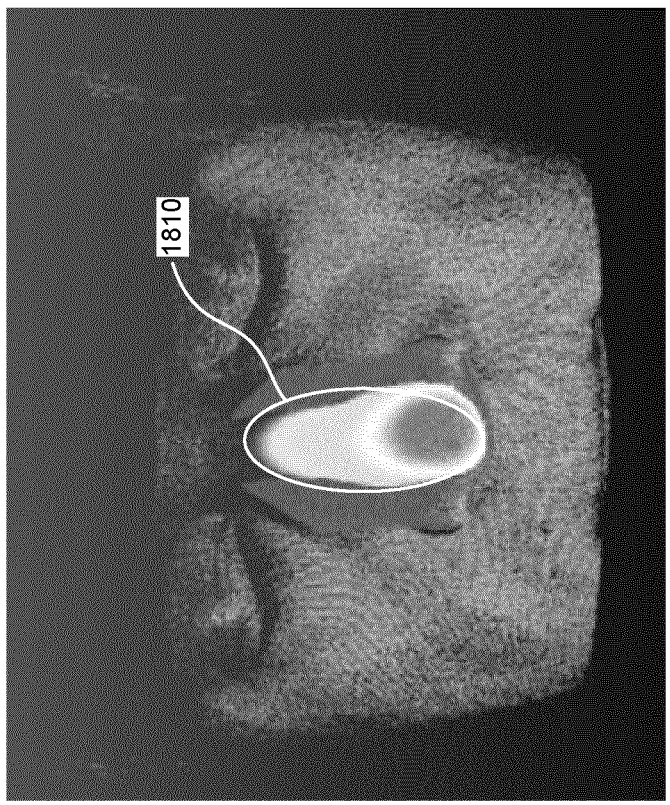

At operation 1414, the processor may extract the nose top surface points and estimate an oriented bounding box of the extracted nose top surface points. FIG. 18A illustrates an extracted nose top surface points 1810, and FIG. 18B illustrates an oriented bounding box of the extracted nose top surface points.

Figure 19:
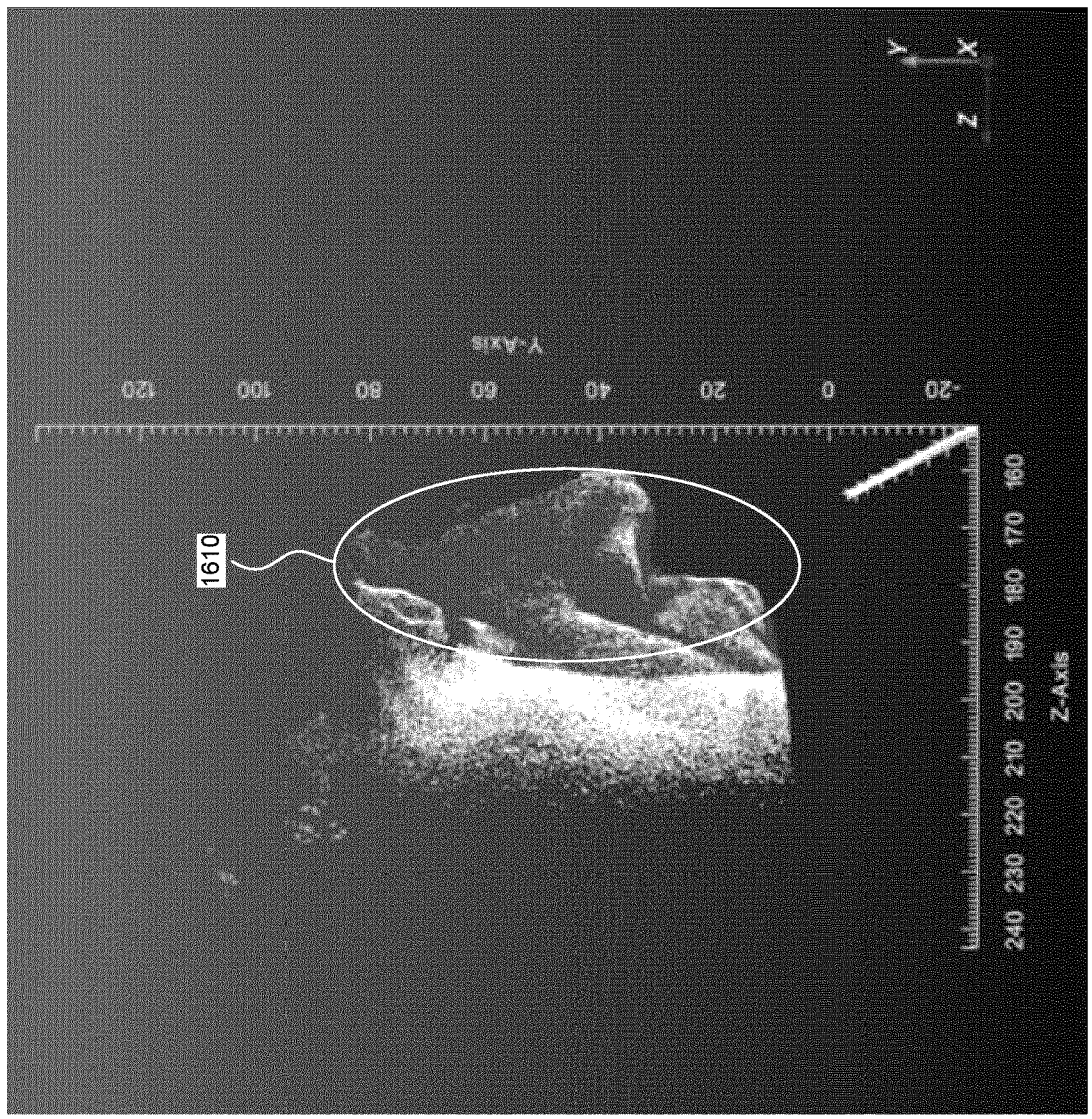

At operation 1416, the processor may rotate the direction normal of maximum bounding length of the estimated oriented bounding box to Y-axis. FIG. 19 illustrates an aligned 3D face point cloud data. At operation 1416, the processor may rotate the data representing the user's face for obtaining a better pose. For example, when obtaining image data representing the user's face, if the user's face is tilted to the left side or to the right side, operation 1416 may include operations to rotate the user's head for compensating for the tilted position.

In some scenarios, it may be beneficial to dynamically or substantially in real-time determine feature parameters of a user's face based on image data representing the user's face. In some embodiments, an aligned 3D point cloud representing a face may be associated with operations for determining feature parameters of a user's face.

Figure 20:
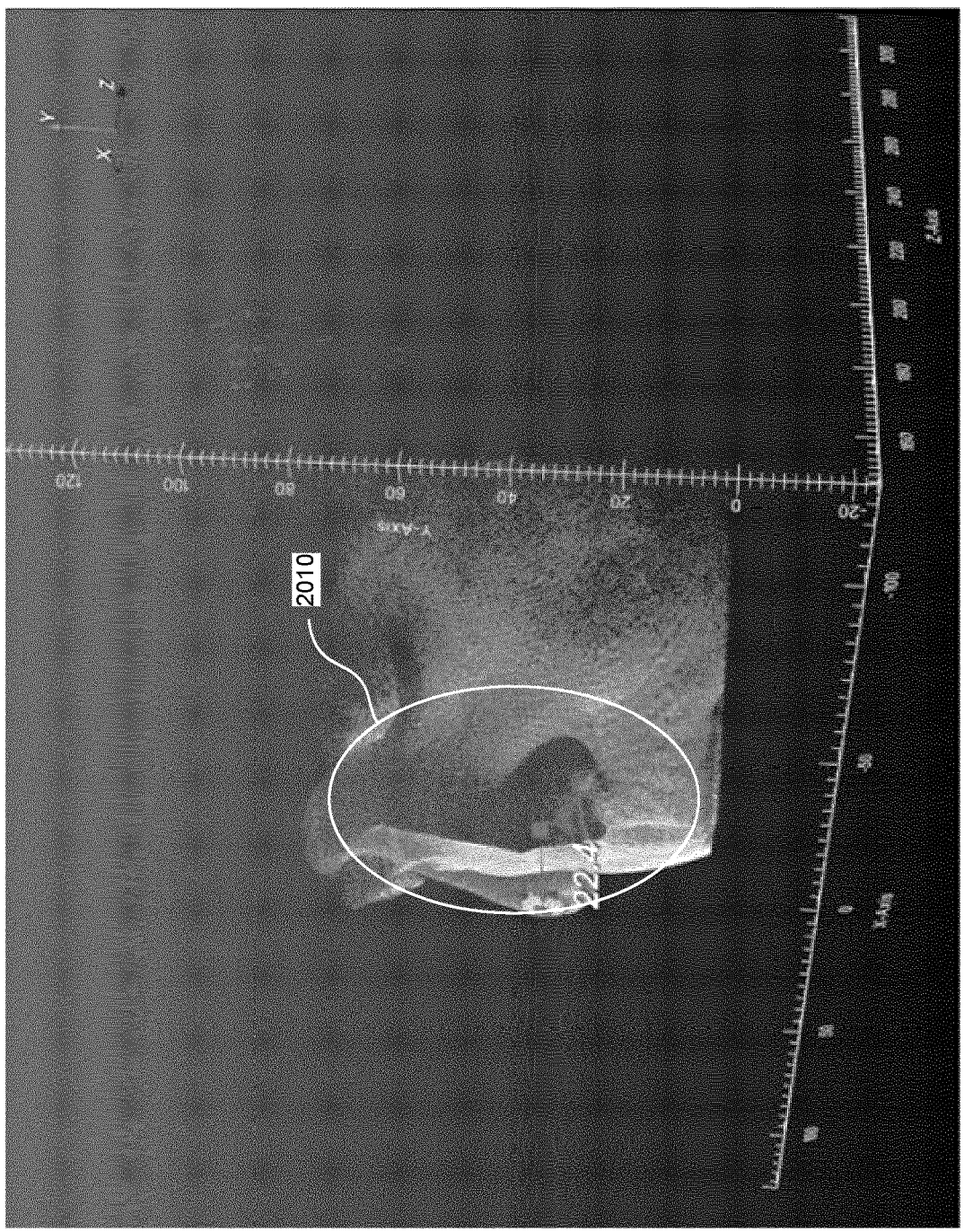

As an example, reference is made to FIG. 20, which illustrates a 3D point cloud of a user's face showing detection of a nose depth parameter, in accordance with embodiments of the present disclosure. FIG. 20 illustrates a front view plane in the X-Y plane of a 3D Euclidean space. In some embodiments, determining feature parameters may be based on pronasale points 2010 extracted from convex hull points of raw scanned face points.

As an example, for determining a depth parameter of a user's nose, the facial device application may include operations for providing a sphere area center at a centroid of pronasale points. The facial device application may include operations for estimating a face base plan from the sphere area center. Further, a processor may detect a distance between the pronasale points and the face base plane for determining a depth of a nose.

Figure 21:
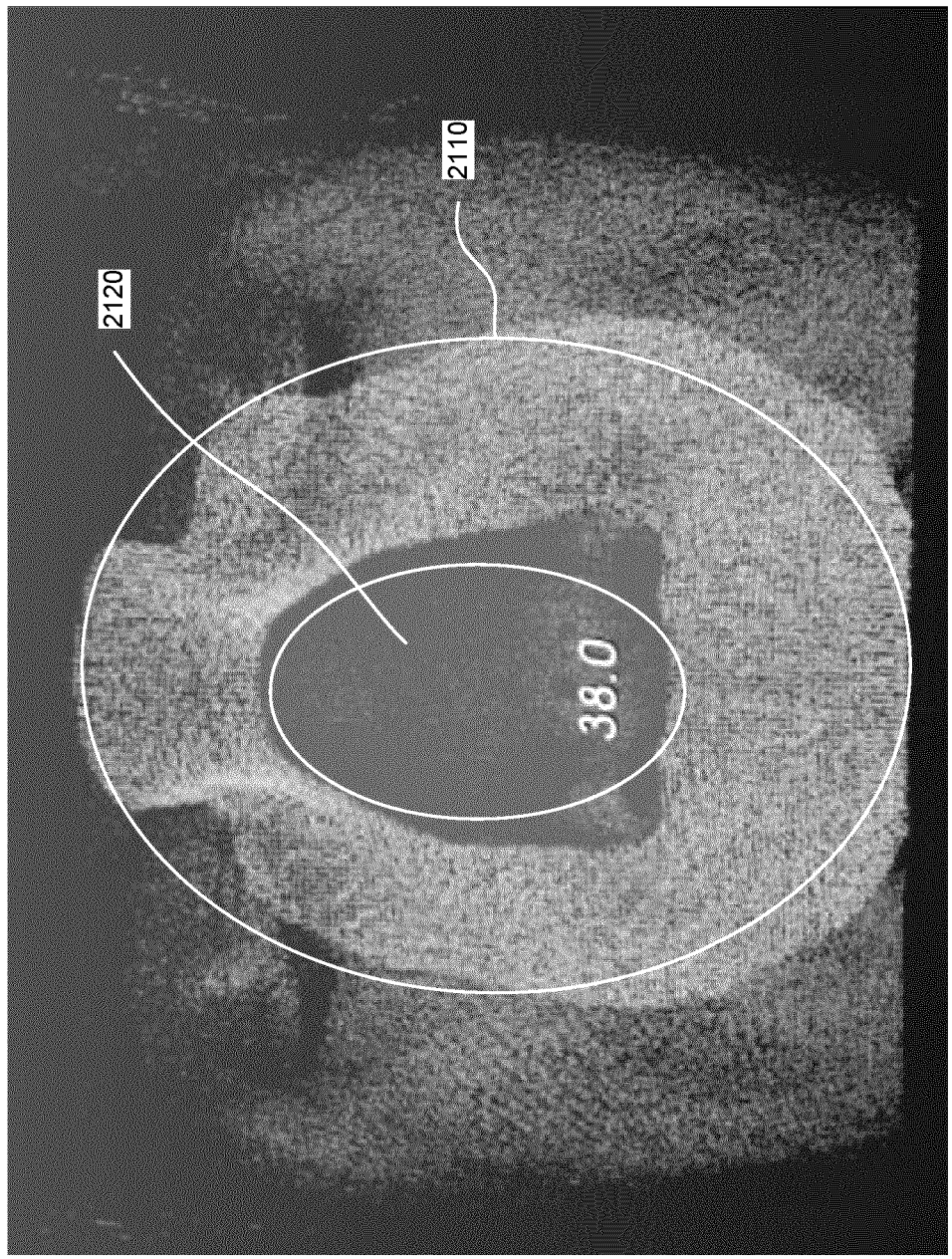

In another example, the facial device application may determine a width of nose points based on a 3D point cloud of a user's face by estimating a normal in the z-axis of candidate pronasale points 2110. Reference is made to FIG. 21, which illustrates a 3D point cloud of a user's face showing candidate pronasale points 2110. The a processor may filter 3D points 2120 representing a user's nose. Based on the filtered 3D points 2120 representing the user's nose, a processor may determine an estimate of a width of the nose points.

Figure 22B:
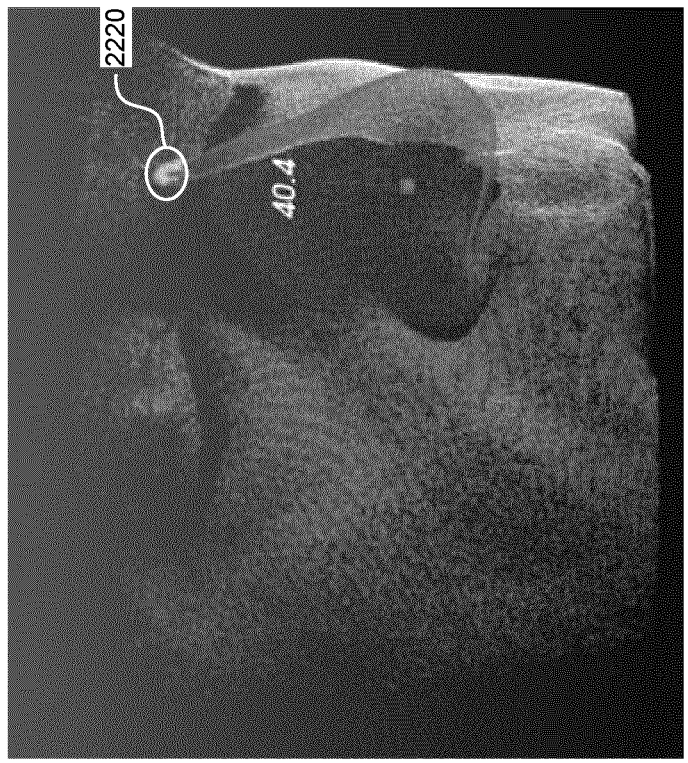
Figure 22A:
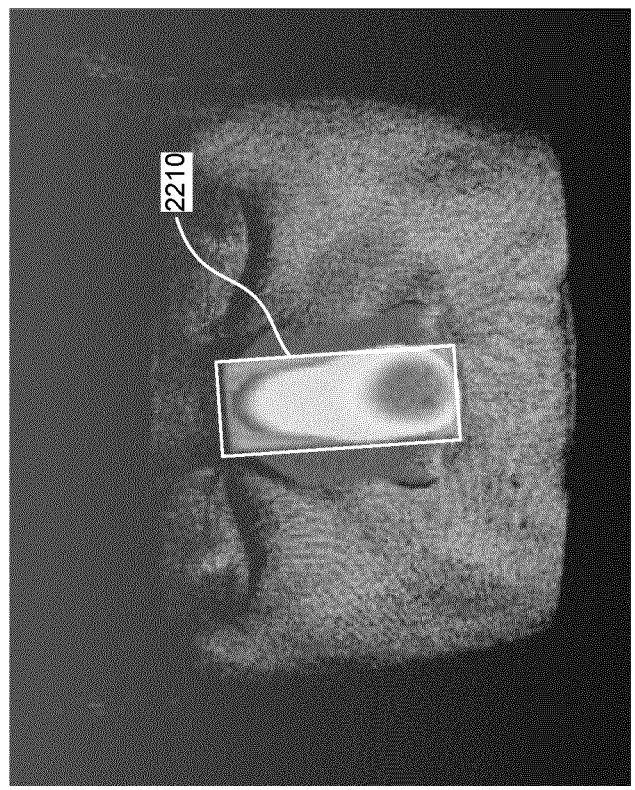

In another example, the facial device application may determine a length of a nose based on a face base plane. Reference is made to FIGS. 22A and 22B, which illustrates a detected nose top surface and a determined nose length, respectively, in accordance with embodiments of the present disclosure.

In FIG. 22A, a detected bounding box 2210 of the nose top surface points is shown. The nose top surface points may be filtered based on the filtered 3D points 2120 (FIG. 21) which represent the user's nose by estimating a normal in a z-axis. The recognized bounding box of the nose top surface points may be extended in the y-axis to generate candidate points. Further, a processor may estimate expected nasion points 2220 parallel with an x-y plane by comparing an angle between its normal and the z-axis. For example, FIG. 22B illustrates example nasion points 2220. Based at least on the above, a length of a nose may be calculated in the face base plane.

Figure 23:
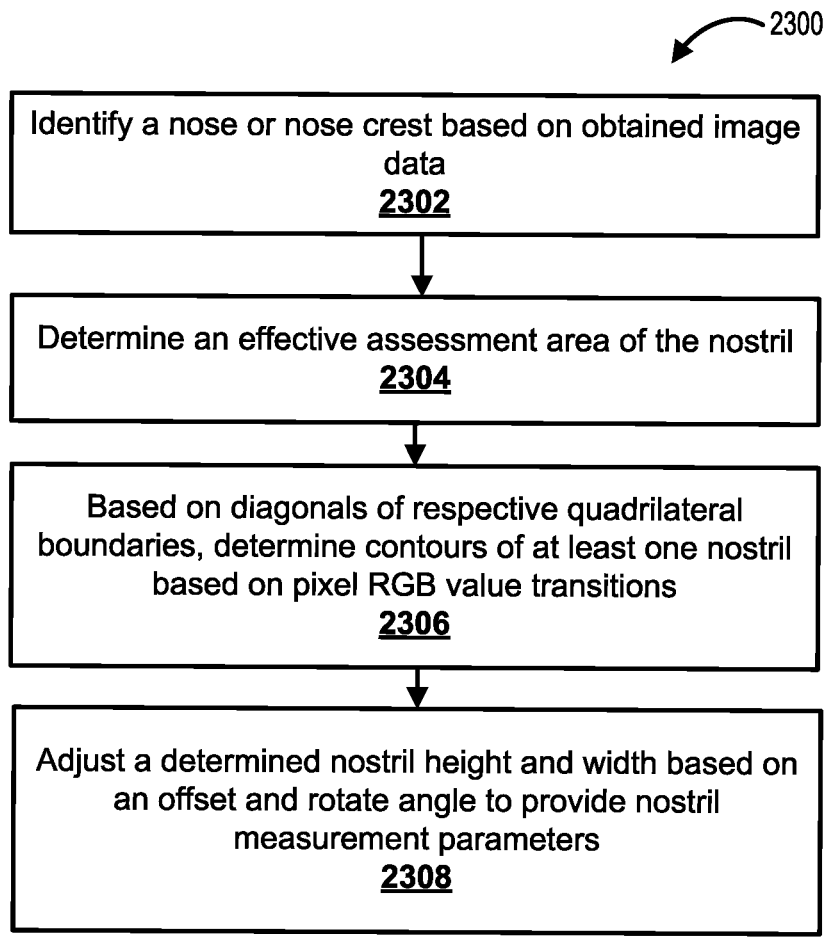
FIG. 23 illustrates a method of determining anatomical dimension data of facial features, in accordance with embodiments of the present disclosure.

Reference is made to FIG. 23, which illustrates a method 2300 of determining anatomical dimension data of user face features, in accordance with embodiments of the present disclosure. The method 2300 may be executed by the processor of one or more computing devices described in the present disclosure. In some embodiments, processor-readable instructions may be stored in memory and may be associated with a facial device application of one or more client devices 120 (FIG. 1). The method 2300 may include operations such as data retrievals, data manipulations, data storage, or the like, and may include other computer executable operations.

As a non-limiting example, the method 2300 may include operations for determining a width or height of a user's nostril. The method 2300 may be based on depth data associated with one or more image frames captured by a TrueDepth™ camera. The method 2300 may be based on detecting transitions of pixel colour values in an RGB image associated with respective ARFrames. Accordingly, embodiments of operations may automatically determine width or height of a nostril in substantially real-time.

In some embodiments, determining anatomical dimension data associated with a user's nostril may be based on operations associated with 2D, single frame image data. Such operations may include detecting transitions of pixel colour values in an RGB image. In some embodiments, operations for determining anatomical dimension data may be based on point cloud data, which may be generated based on depth data obtained from image capture devices (e.g., TrueDepth™ cameras, or the like).

At operation 2302, the processor may identify a nose or nose crest based on obtained image data. In some embodiments, the processor may include operations of a Vision framework for identifying a user's nose or nose crest. For example, FIG. 24A illustrates landmarks 2410 representing a nose crest feature. FIG. 24B illustrates landmarks 2420 representing a nose feature.

At operation 2304, the processor may determine an effective assessment area of the nostril. In some embodiments, determining the effective assessment area may be based on one or a combination of the landmarks 2410 representing the nose crest feature or the landmarks 2420 representing a nose feature.

FIG. 25A shows the determined effective assessment area 2550 based on a combination of the landmarks 2410 representing the nose crest feature and the landmarks 2420 representing the nose feature. FIG. 25B shows the determined effective assessment area 2550 without the above-described landmarks shown.

Figure 26:
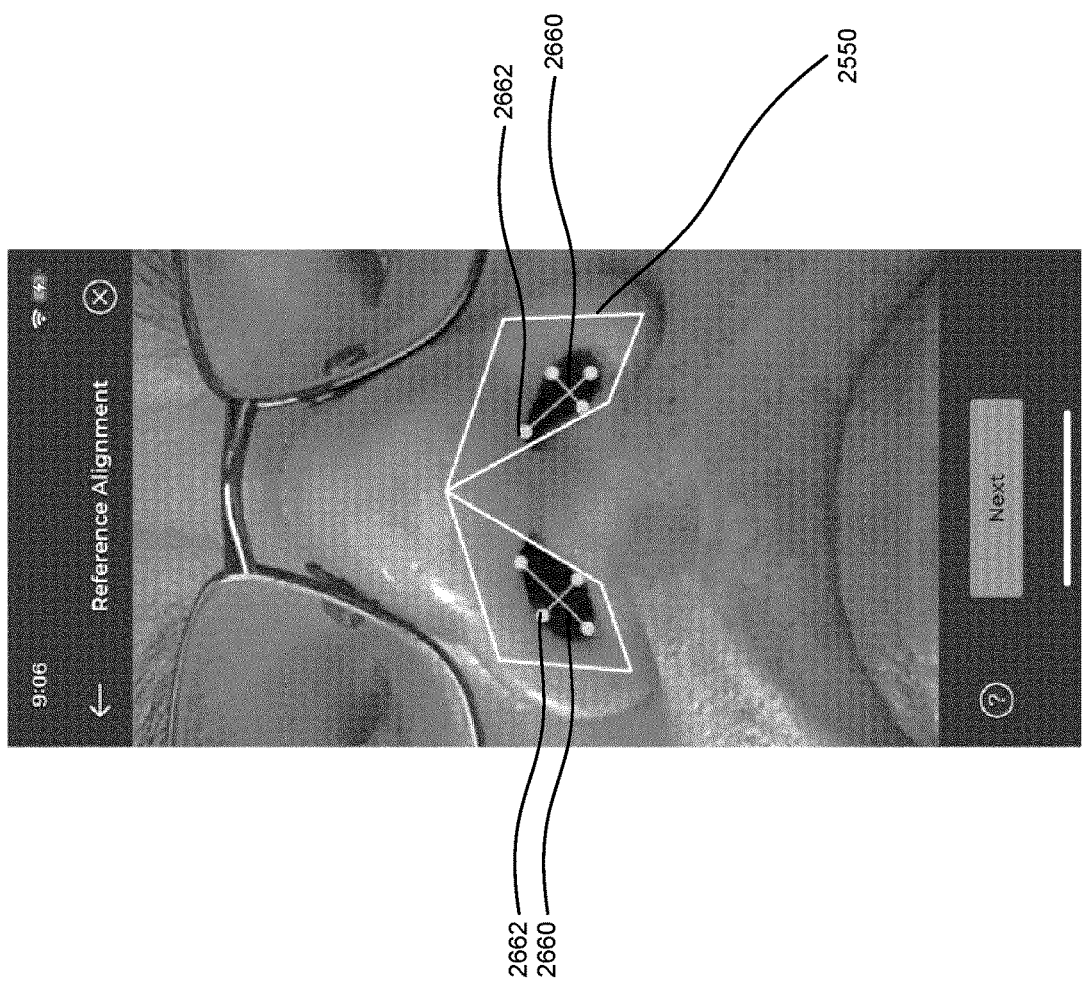

At operation 2306, the processor may, based on diagonals of respective quadrilateral boundaries, determine contours of at least one nostril based on pixel RGB value transitions. For example, FIG. 26 illustrates diagonal marking segments 2660 that may correspond to nostrils of the user. In FIG. 26, the pixel RGB values may transition when transitioning "inwards" from sides of the respective quadrilateral boundaries. In some embodiments, the processor may determine one or more contour points 2662 of the left or right nostrils.

In some embodiments, the processor may determine a "maximum" RGB value based on boundary points of the determined effective assessment area 2550. The processor may determine a "minimum" RGB value based on an identified central subarea of the effective assessment area 2550. In some embodiments, a threshold for identifying a contour or boundary may be based on a determined RGB value range spanning the "maximum" RGB value and the "minimum" RGB value. In some embodiments, the processor may include operations may be based on an average pixel RGB value of neighbouring regions of a given pixel RGB value.

Figure 27B:
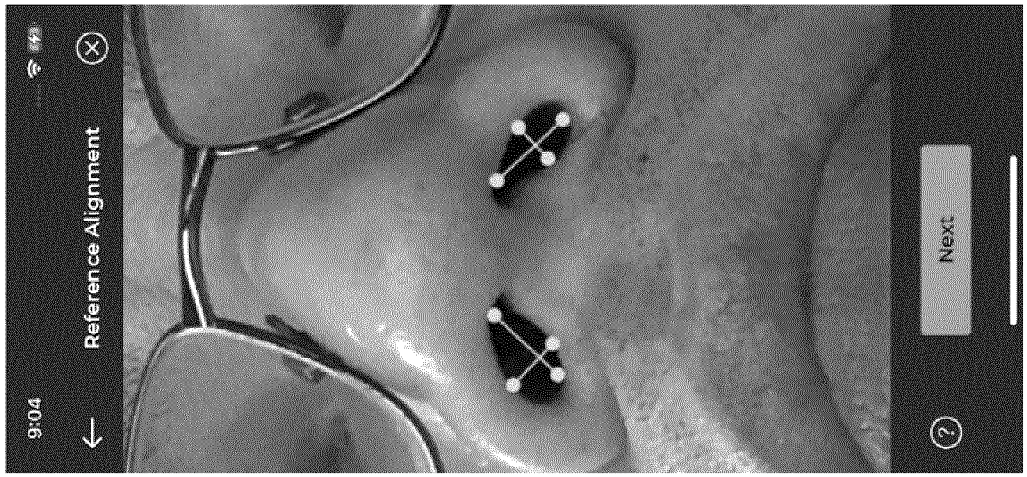
Figure 27A:
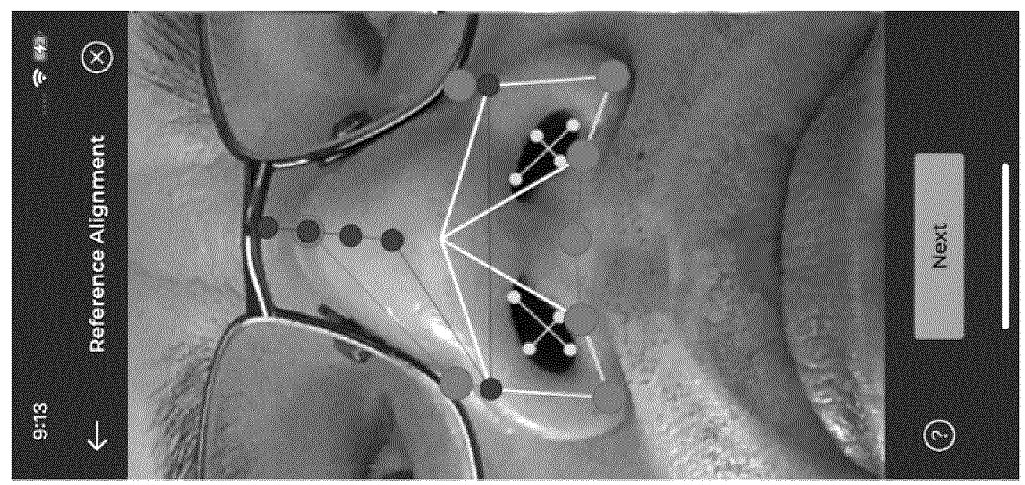

At operation 2308, the processor may adjust a determined nostril height and width based on an offset and rotate angle to provide nostril measurement parameters. For example, as illustrated in FIGS. 27A and 27B, an initial green nostril height and width line may be optimized with an offset and rotate angle to obtain optimal measurement results. In some embodiments, an intersection point of the nostril height line and width line may be identified as a central point for rotation or offset operations. In some embodiments, operations of an amoeba numerical method may be applied to determine maximum height or maximum width values. In some embodiments, operations of a non-linear optimization numerical algorithm may determine optimal objective for rotating angle and offset distance values.

Figure 28:
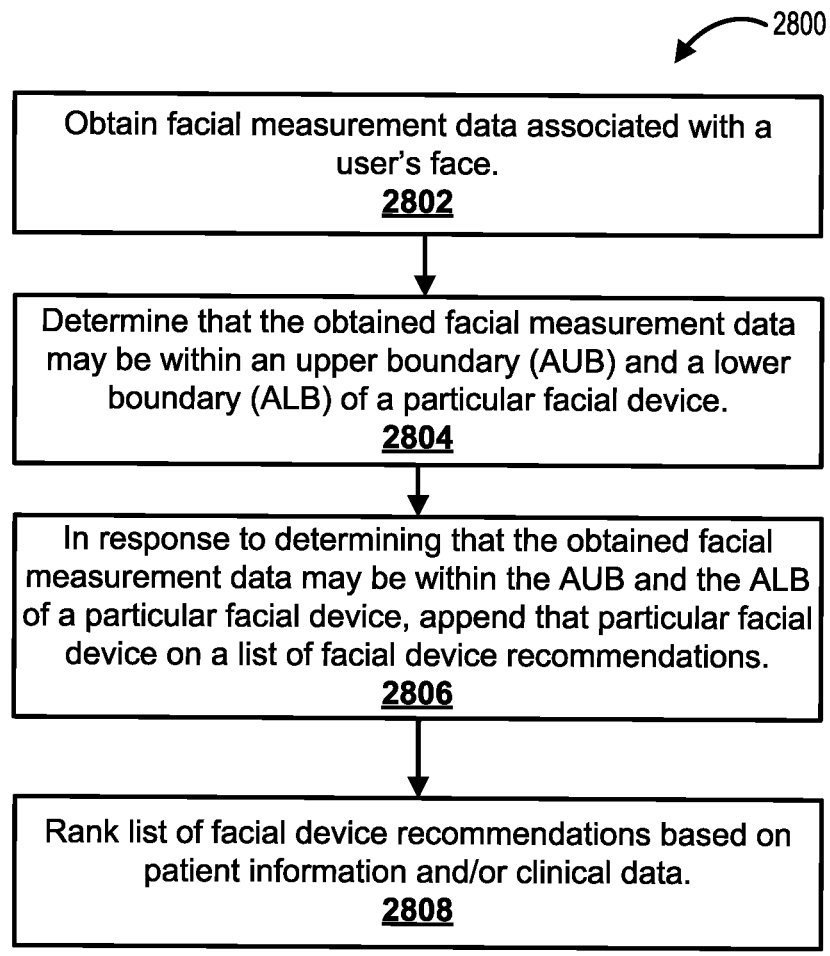
FIG. 28 illustrates a method of determining one or more facial device recommendations, in accordance with embodiments of the present disclosure.

Reference is made to FIG. 28, which illustrates a method 2800 of determining one or more facial device recommendations, in accordance with embodiments of the present disclosure. The method 2800 may be executed by the processor of one or more computing devices described in the present disclosure. In some embodiments, processor-readable instructions may be stored in memory and may be associated with a facial device application of one or more client devices 120 (FIG. 1). The method 2800 may include operations such as data retrievals, data manipulations, data storage, or the like, and may include other computer-executable operations.

In some embodiments, the operations of the method 2800 may include operations for determining whether a target facial device may fit a user's face for optimal operation or comfort. In some embodiments, operations for determining whether a target facial device may fit a user's face may be based on facial device dimensions, such as upper boundary dimensions or lower boundary dimensions, and anatomical dimension data representing the user's face. In some embodiments, the method 2800 may be for providing one or more recommendations for one or a combination of facial device types, such as a full face device, a nasal device, or a nasal pillow device.

At operation 2802, the processor may obtain facial measurement data associated with a user's face. In some embodiments, the facial measurement data may be determined based on embodiment operations described in the present disclosure. For example, the processor may conduct operations for determining anatomical dimension data associated with size of nostril openings. In another example, the processor may conduct operations for determining a width or length of a user's nose.

In some embodiments, determining facial measurement data may be based on one or a combination of 2D image data, such as image data captured based on a TrueDepth™ camera or 3D point cloud image data.

At operation 2804, the processor may determine that the obtained facial measurement data may be within an upper boundary (AUB) and a lower boundary (ALB) of a particular facial device. In some embodiments, respective facial devices may be associated with dimensional data suitable for users associated with particular range of anatomical dimension data (e.g., users having a particular nose length, nostril opening size, or the like).

The processor, at operation 2804, may conduct operations for determining whether the obtained facial measurement data (associated with a particular user) is within an AUB and a ALB for a plurality of facial devices.

In response to determining that the obtained facial measurement data may be within the AUB and the ALB of a particular facial device, the processor at operation 2806 may append that particular facial device on a list of facial device recommendations.

In some embodiments, upon determining a list including one or more facial device recommendations, the processor may conduct operations for sorting the list of facial device recommendations based on quantitative or qualitative data (e.g., user reviews, star ratings, among other examples). Upon sorting the one or more facial device recommendations, the processor may conduct scoring operations to score facial devices for identifying facial devices associated with top scores for presentation to a user interface.

At operation 2808, the processor may conduct operations for sorting or ranking the list of facial devices based on patient information, the device used, and/or patient-specific clinical data. In some embodiments, patient information may include one or more of age, gender, body mass index (BMI), ethnicity, or the like. In some embodiments, the device used may include one or more of CPAP, BiPAP, ASV, and various pressure settings including minimum and maximum pressure settings. In some embodiments, patient-specific clinical data may include one or more of a deviated septum, nasal congestion, seasonal allergies, sleep position (e.g. prone, back, side, restless), facial hair (e.g. mustache, beard), skin sensitivities, claustrophobia, and the like.

In some embodiments, scores may be assigned to each facial device type which may perform better for different clinical parameters. An example table of scores assigned to various facial device types for certain characteristics is provided in FIG. 34. As depicted, scores range from 0 to 3, but it will be appreciated that any suitable scoring scale or system may be used and the table in FIG. 34 is merely an example.

As depicted in FIG. 34, if a patient is claustrophobic, a nasal pillow mask has the highest recommendation score (score 3), then a nasal mask (score 2), and then a full face mask (score 1). Similarly, if a device pressure setting is high (e.g. grater than 10 cmH2O), then nasal masks are likely to provide the best seal (score 3), then full face masks (score 2), then nasal pillow masks (score 1). As another example, if a patient has a mustache, then a nasal pillow mask receives the highest score (score 3), then a full face mask (score 2), and then a nasal mask (score 1).

Figure 35:
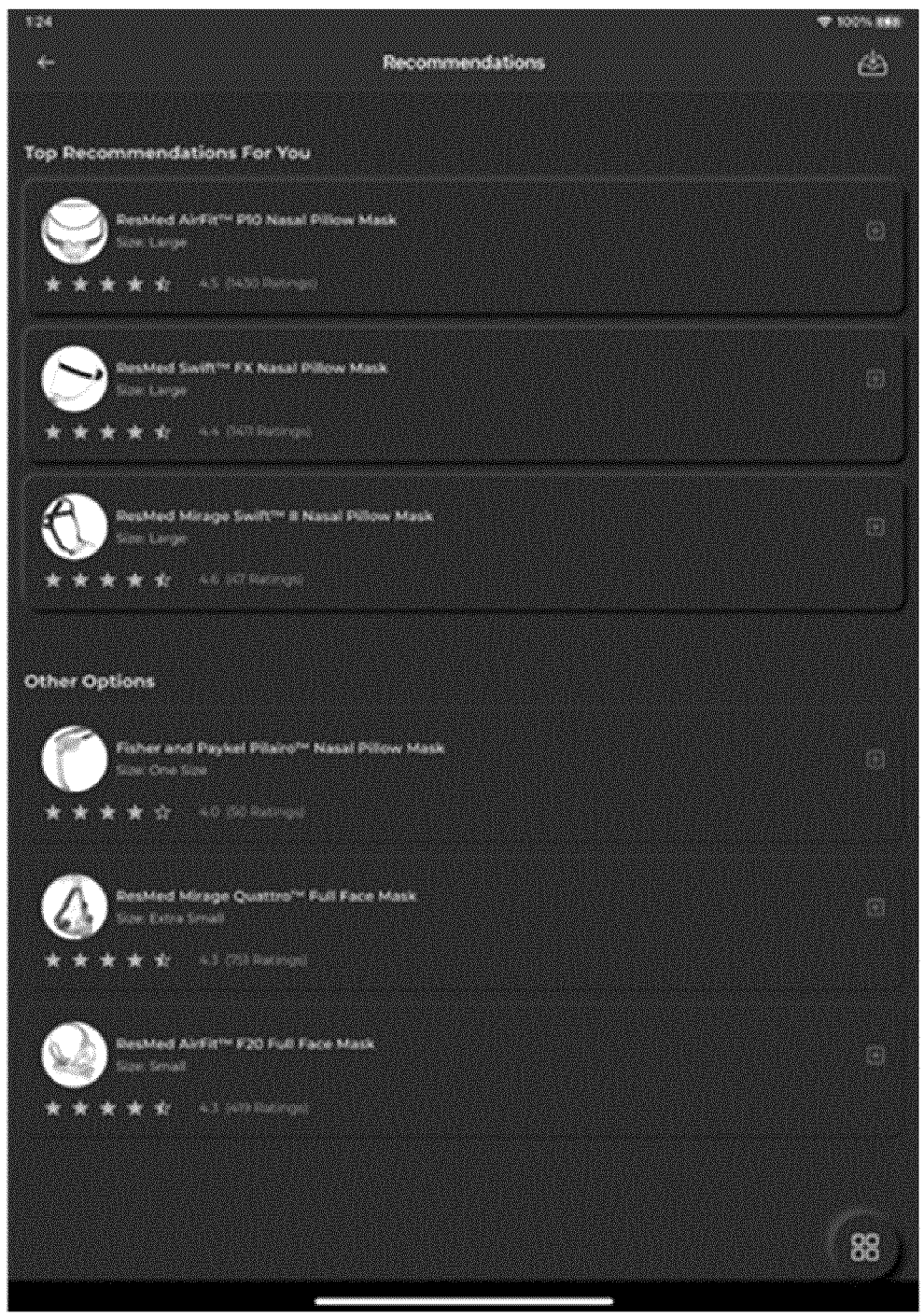
FIG. 35 is an example user interface for providing ranked facial device recommendations, in accordance with embodiments of the present disclosure.

In some embodiments, an overall score for each facial device type may then be obtained. In some embodiments, the overall score may be a sum of the scores for each attribute. In some embodiments, the overall score may be a weighted sum of the scores for each attribute, where weights may be selected to emphasize or de-emphasize the importance of patient qualities or attributes. In some embodiments, the scoring system may then be used to rank the list of facial devices produced at 2806. FIG. 35 is an example user interface providing a user with a list of recommendations for facial devices.

In some embodiments, a patient's history and/or mask preferences may be taken into account when ranking masks. For example, a patient may have already used a certain facial device type previously and subsequently had success in their treatment. For example, if the scoring system provided herein ranks a nasal pillow mask higher than a nasal mask on the recommendation list, but the patient has already successfully used a nasal mask in the past, it is possible that the patient may feel more comfortable using the same facial device type with which they are already familiar (rather than introducing the patient to a new type of mask). In some embodiments, the scoring system may include an indication of whether the patient has previously used a specific facial device type, and if so, may include that patient's rating of that facial device type based on satisfaction and comfort. When the rating of a previously used facial device type is high, the ranking system may push that facial device type higher in the ranked list of facial devices.

Figure 29:
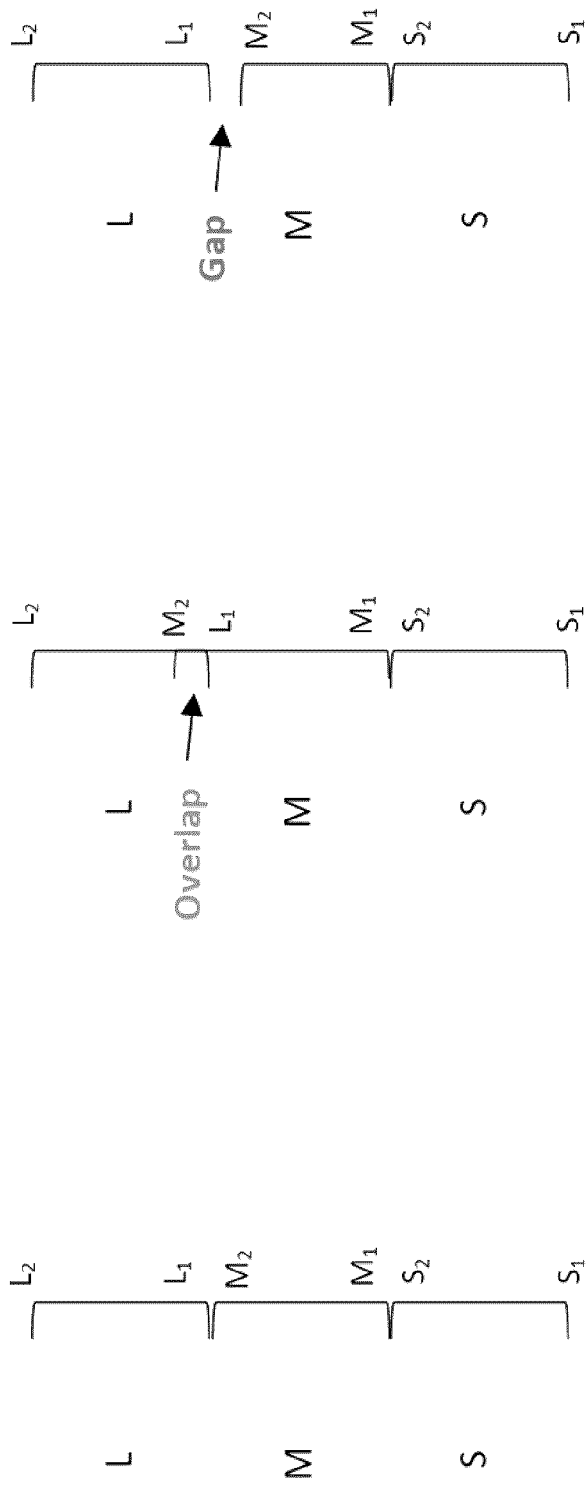
FIG. 29 illustrates sample boundary ranges associated with sizes of facial devices, in accordance with embodiments of the present disclosure.

In some embodiments, the AUB/ALB range between facial device sizes may overlap. To illustrate, reference is made to FIG. 29, which illustrates boundary ranges associated with sizes (e.g., small, medium, large) for an example facial device, in accordance with embodiments of the present disclosure.

In some embodiments, the facial device application may define overlapping sizing boundary values. For example, sizing boundary values (e.g., S1, S2, M1, etc.) may advance in up or down directions based on feedback data received from prior users of the respective facial devices. In some embodiments, the one or more computing devices described in the present disclosure may include machine learning architecture for generating facial device recommendation models. Such facial device recommendation models may, based on feedback data received from prior users of facial devices, dynamically update models for adjusting the sizing boundary ranges or values.

Figure 30:
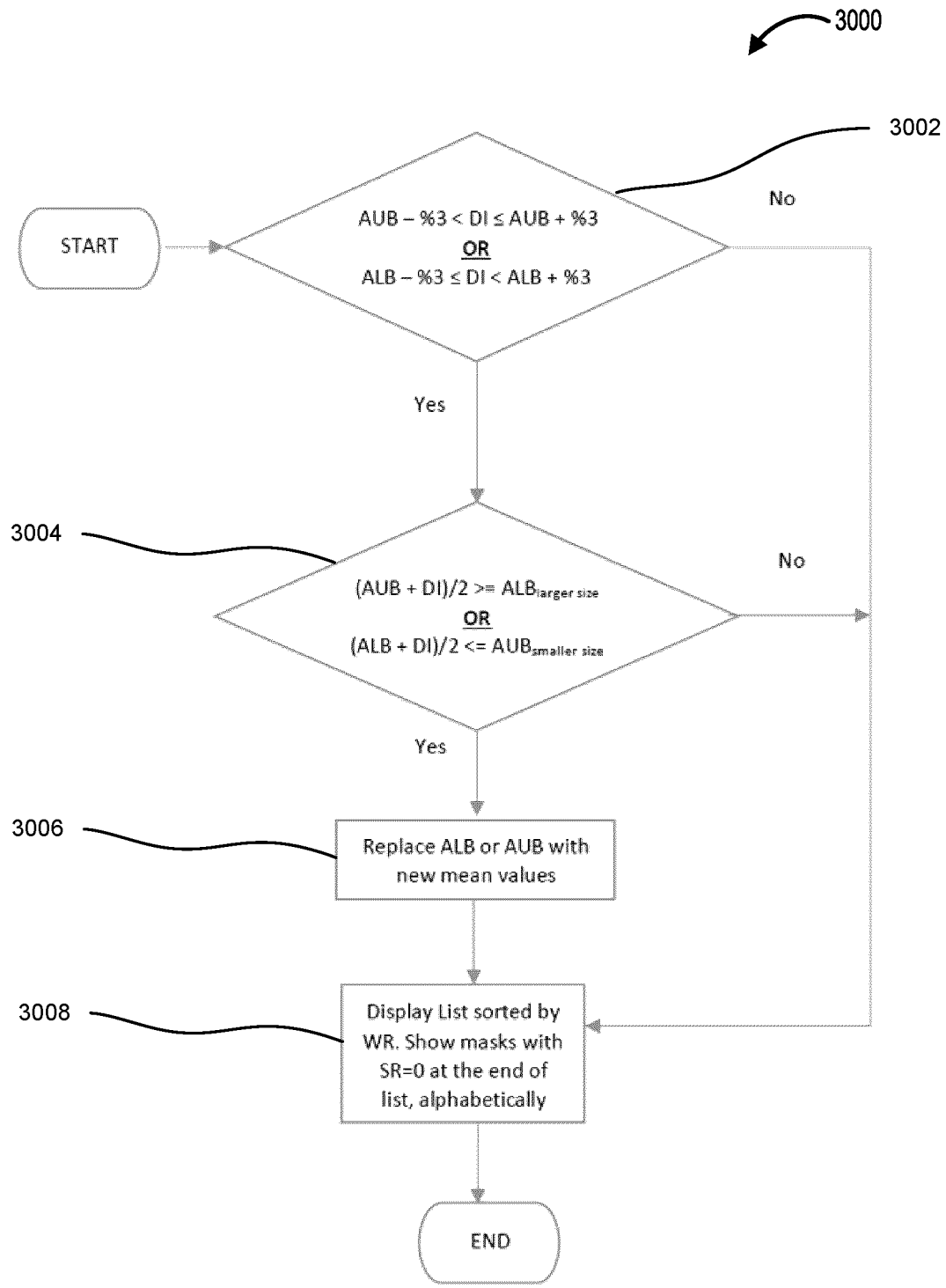
FIG. 30 illustrates a flow chart of a method of updating boundary ranges associated with generating facial device recommendations, in accordance with embodiments of the present disclosure.

In some scenarios, the facial device application may include operations for updating boundaries for particular sizes when mask scoring or star ratings change over time. Reference is made to FIG. 30, which illustrates a flow chart of a method 3000 of updating boundary ranges associated with generating facial device recommendations, in accordance with embodiments of the present disclosure. For example, a ranking/data manipulation when star rating changes: when a mask is rated, then its ranking may change. The ALB and AUB may be for the size of the selected and rated mask.

The method 3000 may be executed by the processor of one or more computing devices described in the present disclosure. In some embodiments, processor-readable instructions may be stored in memory and may be associated with a facial device application of one or more client devices 120 (FIG. 1). The method 3000 may include operations such as data retrievals, data manipulations, data storage, or the like, and may include other computer-executable operations.

At operation 3002, the processor may determine whether: AUB−3%<measurement data input (DI)<=AUB+3% or ALB−3%<=measurement data input<ALB+3%. In the present disclosure, the 3% is provided for ease of exposition; however, the +/−% value may be larger or smaller based on machine learning operations for refining recommendation models.

If the processor at operation 3002 determines yes, at operation 3004, the processor may determine whether (AUB+DI)/2>=ALB$_{larger\ size}$ or (ALB+DI)/2<=AUB$_{smaller\ size}$.

If the processor at operation 3004 determines yes, the processor at operation 3006 may replace the ALB or the AUB with new mean values.

At operation 3006, the processor may sort a display list by weighted ratings (WR). In some embodiments, a weighted rating may be a sum of Sn values (see relationship below) calculated based Bayesian analysis. The processor may include operations to show masks with particular star ratings (SR=0) at the end of the list, alphabetically.

In embodiments where the processor at operation 3002 or operation 3004 determines "no", the processor may conduct operation 300 for sorting the Display List by WR. Further, the processor may show facial devices with SR=0 at the end of the list, alphabetically In some embodiments, the facial device application described herein may obtain user input including facial device ratings. In some embodiments, the facial device rating may be a rating associated with a new mask, or may be a rating of an existing mask. In some embodiments, the processor may determine or update a facial device rank based on the following relationship.

Presume that have K possible ratings, indexed by k, each worth sk points. For "star" rating systems, sk=k (e.g., 1 point, 2 points, etc.). Presume a given item has received N total ratings, with nk ratings for k. The facial device application may include instructions for sorting facial devices based on the criterion:

$$S(n_1, \ldots, n_k) =$$

$$\sum_{k=1}^{K} s_k \frac{n_k+1}{N-K} - z_{\alpha/2} \sqrt{\left(\left(\sum_{k=1}^{K} s_k^3 \frac{n_k+1}{N-K}\right) - \left(\sum_{k=1}^{K} s_k \frac{n_k+1}{N-K}\right)^2\right) / (N+K+1)}$$

where $z\alpha/2$ is the $1-\alpha/2$ quantile of a normal distribution. The above-described expression may be the lower bound of a normal approximation to a Bayesian credible interval for the average rating. In some embodiments, the value of sk in the above-described expression may be a star rating.

Based on the above-described embodiment criterion, the facial device application may include operations for displaying a facial device mask list that may be ranked based on the "S number".

In some embodiments, scoring for respective facial devices may be based on weights or weighted ratings representing a likelihood of optimal fit for a given user. In some scenarios, weights may be associated with scores or other metrics for generating facial device recommendations for a user.

In some embodiments, computing devices may generate a user interface for display at one or more computing devices (of FIG. 1), in accordance with embodiments of the present disclosure. The one or more computing devices may conduct operations of automatic 3D sensing measurement based on a generic tracking model for analyzing a user's face for a full face/nasal facial device.

Figure 31:
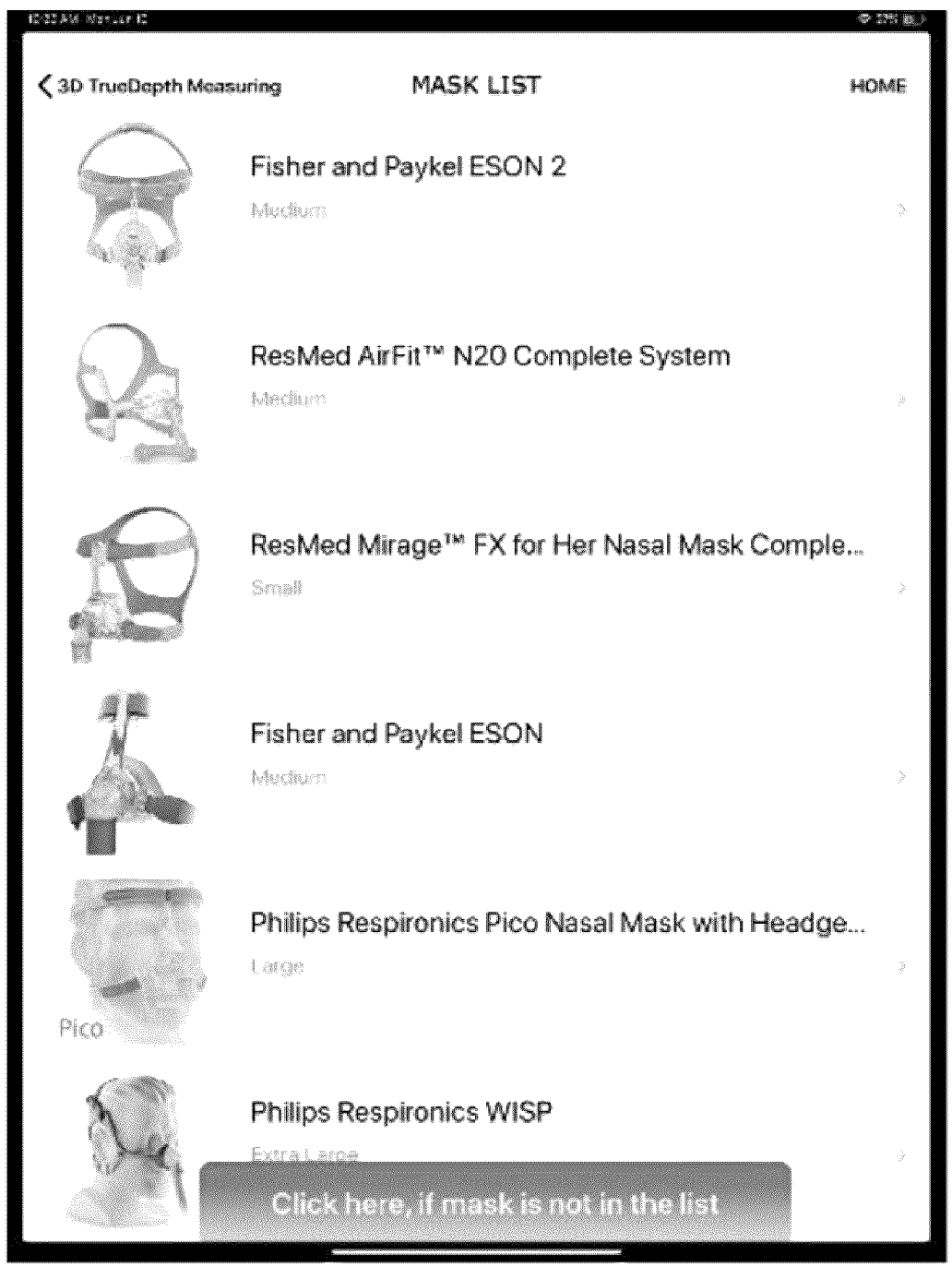
Figure 32:
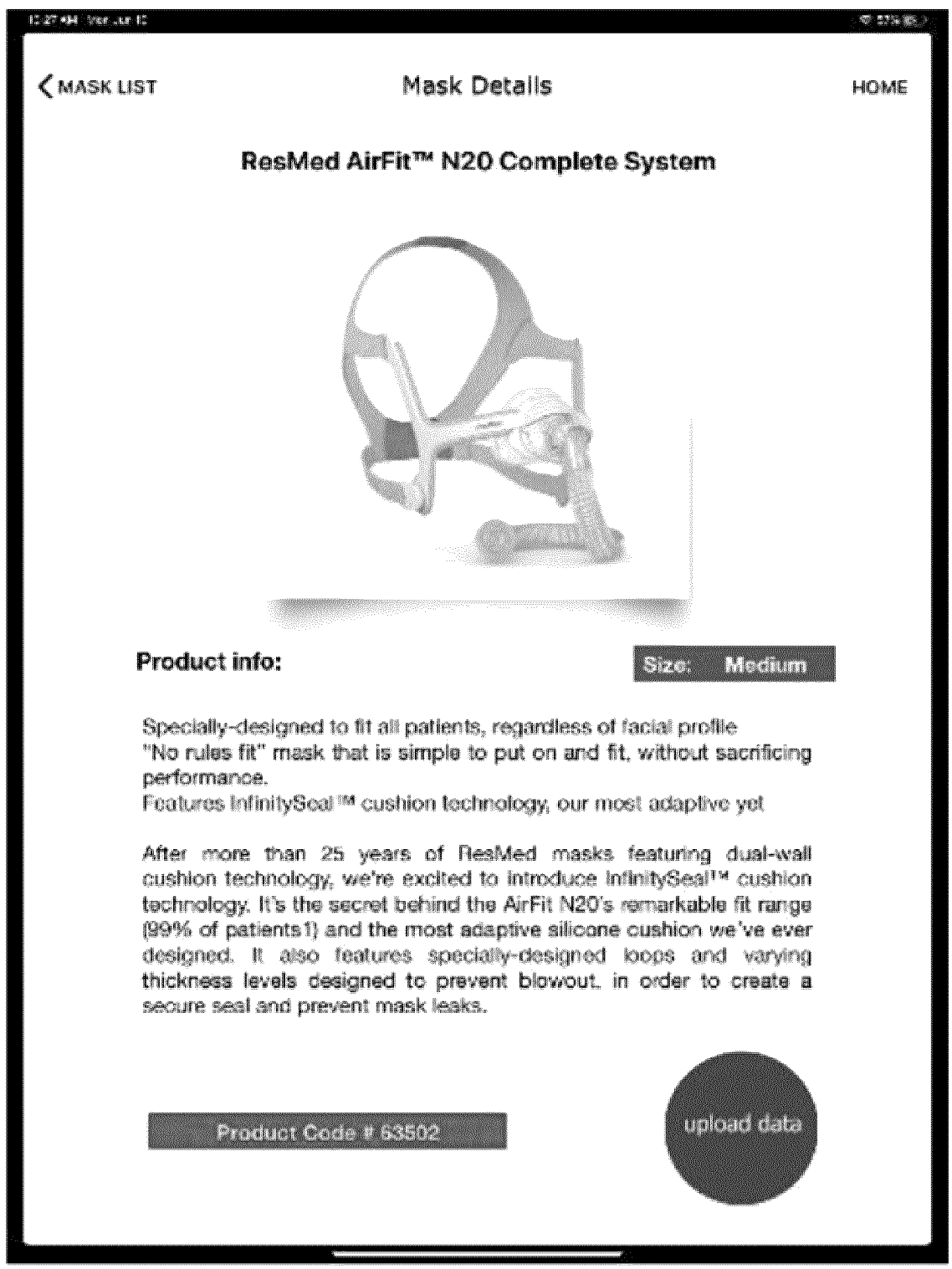
Figure 33:
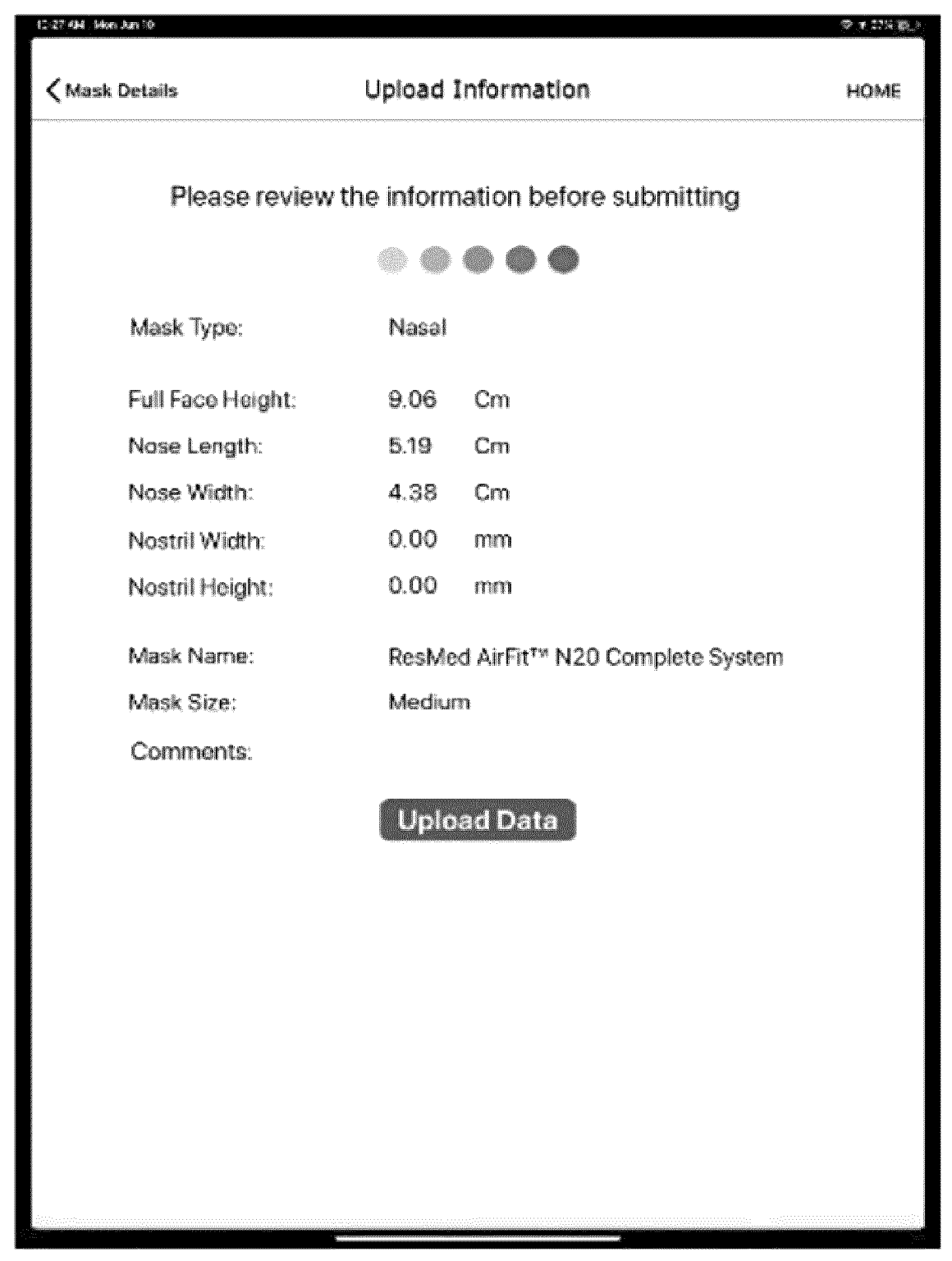

FIGS. 31 to 33 illustrate user interfaces for display at one or more computing devices (of FIG. 1), in accordance with embodiments of the present disclosure. The user interfaces may include facial device recommendation lists or details associated with respective facial devices. In some embodiments, the user interfaces may include user interfaces for displaying anatomical dimension data based on image processing operations described in the present disclosure. In some embodiments, the user interfaces may be associated with operations for dynamically determining anatomical dimension data associated with generating recommendations for nasal pillow facial devices.

In some embodiments described in the present disclosure, the computing devices may determine anatomical dimension data associated with facial features of a user. In some other embodiments, the computing devices may determine dimensional data for facial devices or other nasal-oral appliances based on image data representing the same. For example, computing devices may be configured to receive image data (e.g., photos) of nasal-oral appliances, and may be configured to determine physical dimensions of the nasal-oral appliances. As such, the computing devices may generate dimension data sets associated with a plurality of nasal-oral appliances based at least on a combination of: (i) device manufacturer specifications; and (ii) dimension data determined based on image data.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present disclosure is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

The description provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

As can be understood, the examples described above and illustrated are intended to be exemplary only.

What is claimed is:

1. A computing device for adaptively generating facial device selections based on visually determined anatomical dimension data comprising:
a processor;
a memory coupled to the processor and storing processor-executable instructions that, when executed, configure the processor to:
receive image data representing a user face;
determine anatomical dimension data associated with a nasal-oral region of the user face based on the received image data, said determining comprising:
identify a facial feature based on the received image data;
determine an effective assessment area of the facial feature, wherein the facial feature includes a nostril;
based on diagonals of respective quadrilateral boundary markers, determine contours of at least one nostril based on pixel RGB value transitions;
adjust a determined nostril height and width based on at least one of an offset or rotate angle to provide nostril measurement parameters;
generate one or more facial device recommendations based on a recommendation model and the anatomical dimension data, the recommendation model defined based on a Bayesian-based scoring metric; and
provide the one or more facial device recommendations for display at a user interface.

2. The computing device of claim 1, wherein the memory includes processor-executable instructions that, when executed, configure the processor to:
receive, via the user interface, target therapy data including at least one of user preferences or target facial device specification data,
and wherein the generated one or more facial device recommendations is based on the target therapy data in combination with the anatomical dimension data.

3. The computing device of claim 1, wherein the one or more facial device recommendations includes at least one of a full facial/nasal mask associated with a PAP device or a nasal pillow mask.

4. The computing device of claim 1, wherein the received image data includes a combination of RGB image data and infrared depth data.

5. The computing device of claim 1, wherein generating the one or more facial device recommendations includes determining that the anatomical dimension data is within an upper boundary specification and a lower boundary specification associated with a prospective facial device,
and wherein at least one boundary specification of a given facial device size overlaps with another boundary specification of an adjacent facial device size.

6. The computing device of claim 1, wherein determining anatomical dimension data associated with the nasal-oral region of the user face is based on at least one of three-dimensional (3D) point cloud data or two-dimensional image data.

7. The computing device of claim 1, wherein determining anatomical dimension data includes determining nostril opening dimensions based on transitions of RGB image data values beyond one or more threshold values.

8. The computing device of claim 7, wherein the determined anatomical dimension data includes at least one of nostril opening size, nose width, nose depth, nose length, or face width.

9. The computing device of claim 1, wherein the memory includes processor-executable instructions that, when executed, configure the processor to estimate head pose based on 3D point-cloud data.

10. A computing device for adaptively generating facial device selections based on visually determined anatomical dimension data comprising:
a processor,
a memory coupled to the processor and storing processor-executable instructions that, when executed, configure the processor to:
receive image data representing a user face;
determine anatomical dimension data associated with a nasal-oral region of the user face based on the received image data, said determining comprising:
generate a convex hull based on a 3D point cloud associated with image data of the user face;
filter pronasale points based on a minimum z-axis value of a 3D Euclidean space;
generate a sphere centered at the pronasale points;
generate a plane normal of the filtered face base area;
align the estimated plan normal to the z-axis;
filter alare points based on estimating the normal in z-axis of data points;
extract the nose top surface points and estimate an oriented bounding box of extracted nose top surface points;
rotate the direction normal of maximum bounding length of the estimated oriented bounding box to a y-axis;
generate one or more facial device recommendations based on a recommendation model and the anatomical dimension data, the recommendation model defined based on Bayesian-based scoring metric; and
provide the one or more facial device recommendations for display at a user interface.

11. The computing device of claim 1, further comprising, for each of said one or more facial device recommendations, assigning a score for one or more of patient attributes.

12. The computing device of claim 11, wherein patient attributes comprise at least one of a deviated septum, nasal congestion, seasonal allergies, sleeping position, facial hair, skin sensitivities, and/or claustrophobia.

13. A method for adaptively generating facial device selections based on visually determined anatomical dimension data comprising:
receiving image data representing a user face;
determining anatomical dimension data associated with a nasal-oral region of the user face based on the received image data comprising:
identifying a facial feature based on the received image data;
determining an effective assessment area of the facial feature, wherein the facial feature includes a nostril;
based on diagonals of respective quadrilateral boundary markers, determining contours of at least one nostril based on pixel RGB value transitions; and
adjusting a determined nostril height and width based on at least one of an offset or rotate angle to provide nostril measurement parameters;
generating one or more facial device recommendations based on a recommendation model and the anatomical dimension data, the recommendation model defined based on a Bayesian-based scoring metric; and
providing the one or more facial device recommendations for display at a user interface.

14. A non-transitory computer-readable medium or media having stored thereon machine interpretable instructions which, when executed by a processor, cause the processor to perform a computer-implemented method for adaptively generating facial device selections based on visually determined anatomical dimension data, the method comprising:
   receiving image data representing a user face;
   determining anatomical dimension data associated with a nasal-oral region of the user face based on the received image data, said determining comprising:
      identifying a facial feature based on the received image data;
      determining an effective assessment area of the facial feature, wherein the facial feature includes a nostril;
      based on diagonals of respective quadrilateral boundary markers, determining contours of at least one nostril based on pixel RGB value transitions; and
      adjusting a determined nostril height and width based on at least one of an offset or rotate angle to provide nostril measurement parameters;
   generating one or more facial device recommendations based on a recommendation model and the anatomical dimension data, the recommendation model defined based on a Bayesian-based scoring metric; and
   providing the one or more facial device recommendations for display at a user interface.

* * * * *